(12) United States Patent
Niven et al.

(10) Patent No.: US 7,758,087 B2
(45) Date of Patent: Jul. 20, 2010

(54) COUPLING APPARATUS

(75) Inventors: David Niven, New Plymouth (NZ); Dennis Robert Mario Fernandes, New Plymouth (NZ)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 12/135,786

(22) Filed: Jun. 9, 2008

(65) Prior Publication Data

US 2008/0303266 A1    Dec. 11, 2008

Related U.S. Application Data

(63) Continuation of application No. 11/609,797, filed on Dec. 12, 2006, now Pat. No. 7,384,077, which is a continuation of application No. 10/399,053, filed as application No. PCT/NZ01/00227 on Oct. 16, 2001, now Pat. No. 7,147,254.

(30) Foreign Application Priority Data

Oct. 16, 2000    (NZ) ..................... 507539

(51) Int. Cl.
   *F16L 21/00* (2006.01)
(52) U.S. Cl. .................. 285/411; 285/419; 285/415; 166/77.52
(58) Field of Classification Search ............ 285/411, 285/419, 415, 320; 166/77.52; 175/85
   See application file for complete search history.

(56) References Cited

U.S. PATENT DOCUMENTS

| | | | |
|---|---|---|---|
| 793,209 A | 6/1905 | Miller | |
| 2,649,314 A * | 8/1953 | Richardson | .................. 285/33 |
| 3,841,665 A | 10/1974 | Capot | |
| 3,915,244 A | 10/1975 | Brown | |
| 4,574,882 A | 3/1986 | Szarka | |
| 4,613,161 A | 9/1986 | Brisco | |
| 4,867,236 A | 9/1989 | Haney et al. | |
| 4,919,462 A * | 4/1990 | Matsui et al. | ............ 285/149.1 |
| 5,152,554 A | 10/1992 | LaFleur et al. | |
| 5,282,653 A | 2/1994 | LaFleur et al. | |
| 5,297,833 A | 3/1994 | Willis et al. | |
| 5,441,310 A | 8/1995 | Barrett et al. | |
| 5,645,131 A | 7/1997 | Trevisani | |
| 5,682,952 A | 11/1997 | Stokley | |
| 5,860,680 A | 1/1999 | Drijver et al. | |
| 5,868,524 A | 2/1999 | Martin | |

(Continued)

FOREIGN PATENT DOCUMENTS

DE    41 13 847    10/1992

(Continued)

*Primary Examiner*—David E Bochna
(74) *Attorney, Agent, or Firm*—Patterson & Sheridan, L.L.P.

(57) ABSTRACT

An apparatus configured to a downhole tubular to a pump. The apparatus comprises: a body portion having a bore; a locking assembly comprising at least one locking member pivotally mounted to the body portion so as to permit the locking member to be pivoted between an open position in which the downhole tubular can be inserted into the bore of the body portion, and a closed position in which the locking member engages the downhole tubular so as to lock the downhole tubular in the bore of the body portion. Fixing means is provided for fixing the looking member in the closed position. A method of drilling a wellbore using a borehole casing.

27 Claims, 19 Drawing Sheets

U.S. PATENT DOCUMENTS

| | | |
|---|---|---|
| 6,254,145 B1 * | 7/2001 | Schwarz et al. ............. 285/319 |
| 6,309,002 B1 | 10/2001 | Bouligny |
| 6,311,792 B1 | 11/2001 | Scott et al. |
| 6,443,241 B1 | 9/2002 | Juhasz et al. |
| 6,517,125 B2 | 2/2003 | Brisco |
| 6,527,047 B1 | 3/2003 | Pietras |
| 6,527,493 B1 | 3/2003 | Kamphorst et al. |
| 6,536,520 B1 | 3/2003 | Snider et al. |
| 6,578,881 B2 | 6/2003 | Lynn et al. |
| 6,622,796 B1 | 9/2003 | Pietras |
| 6,705,405 B1 | 3/2004 | Pietras |
| 6,725,938 B1 | 4/2004 | Pietras |
| 6,732,822 B2 | 5/2004 | Slack et al. |
| 6,742,584 B1 | 6/2004 | Appleton |
| 6,742,596 B2 | 6/2004 | Haugen |
| 6,976,298 B1 | 12/2005 | Pietras |
| 7,137,454 B2 | 11/2006 | Pietras |
| 7,147,254 B2 | 12/2006 | Niven et al. |
| 7,547,048 B2 * | 6/2009 | Catlow ....................... 285/305 |

FOREIGN PATENT DOCUMENTS

| | | |
|---|---|---|
| EP | 0 093 561 | 9/1983 |
| EP | 0 285 385 | 5/1988 |
| EP | 0 286 302 | 12/1988 |
| EP | 0 311 455 | 12/1989 |
| EP | 0 525 247 | 3/1993 |
| WO | WO 96/07009 | 3/1996 |
| WO | WO 01/12933 | 2/2001 |

* cited by examiner

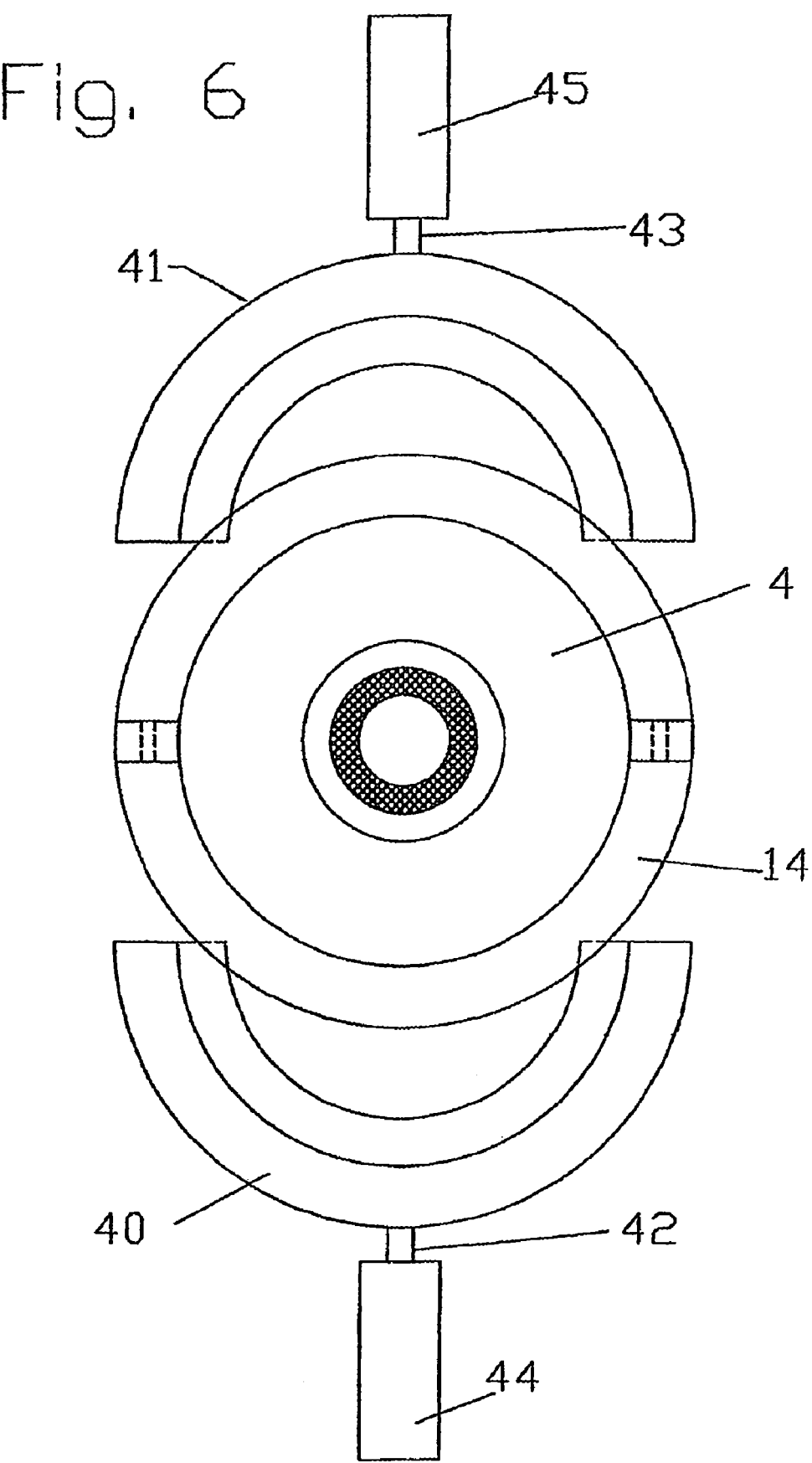

COUPLING APPARATUS

CROSS-REFERENCE TO RELATED APPLICATIONS

This application is a continuation of U.S. patent application Ser. No. 11/609,797, filed Dec. 12, 2006, now U.S. Pat. No. 7,384,077, which is a continuation of Ser. No. 10/399,053, filed Oct. 2, 2003, now U.S. Pat. No. 7,147,254, which is a §371 application of PCT Application No. PCT/NZ01/00227, filed on Oct. 16, 2001, which claims benefit of New Zealand patent application number 507539, filed Oct. 16, 2000. Each of the aforementioned related patent applications is herein incorporated by reference.

BACKGROUND OF THE INVENTION

1. Field of the Invention

The present invention relates to coupling apparatus for coupling a downhole tubular (such as a borehole casing) to a pump, conventionally known as a circulating head. The invention also relates to a method of pumping fluid into a downhole tubular, and to a method of drilling.

2. Description of the Related Art

A conventional circulating head is described by LeFleur et al in U.S. Pat. Nos. 5,282,653, 5,152,554 and 5,348,351. As described by LeFleur et al, when casing is being run in connection with the drilling of an oil or gas well, it sometimes becomes necessary to connect surface pumping equipment to circulate drilling fluid down the well. Typically, this need arises when a tight spot is encountered and drilling fluid is circulated down the well to run the casing past the tight spot and avoid the need for removing the casing and redrilling the hole.

The circulating head described by LeFleur et al uses a segmented ring of eight dogs to lock a cylindrical member in place. The dogs are fixed in place by rotating a bottom end cap.

This arrangement suffers from a number of problems. Firstly the apparatus has a large number of working parts. Secondly it can be difficult and time consuming to rotate the bottom end cap.

SUMMARY OF THE INVENTION

An object of the invention is to address these problems or at least to provide the public with a useful alternative.

According to a first aspect of the invention there is provided apparatus for coupling a downhole tubular to a pump, the apparatus comprising: a body portion having a bore; a locking assembly comprising at least one locking member pivotally mounted to the body portion so as to permit the locking member to be pivoted between an open position in which the downhole tubular can be inserted into the bore of the body portion, and a closed position in which the locking member engages the downhole tubular so as to lock the downhole tubular in the bore of the body portion; and fixing means for fixing the locking member in the closed position.

The invention provides a simple construction which enables the pump and tubular to be easily and quickly connected.

Preferably the locking assembly comprises a pair of locking members pivotally mounted to the body portion at a substantially common pivot point.

Typically the apparatus further comprises one or more pivot pins pivotally mounting the locking member(s) to the body portion.

Any suitable means may be provided for fixing the locking member(s) in the closed position. In a preferred embodiment the fixing means comprises a lever clamp mechanism.

Typically the body portion comprises an upwardly directed locking surface which engages a locking surface of the locking member(s).

In the arrangement of LeFleur et al the body of the apparatus has a radially outer ring with an upper surface. The dogs are secured to the ring by screws, which engage the upper surface of the ring. A problem with this arrangement is that the screws are not sufficiently strong to enable the apparatus to support a heavy weight.

In accordance with a second aspect of the invention there is provided apparatus for coupling a downhole tubular to a pump, the apparatus comprising: a body portion having a bore and a locking surface which is upwardly directed, when in use; a locking assembly comprising at least one unitary locking member having first and second locking surfaces, wherein the locking member is movably mounted to the body portion so as to permit the locking member to be moved between an open position in which the downhole tubular can be inserted into the bore of the body portion, and a closed position in which the first locking surface engages the downhole tubular so as to lock the downhole tubular in the bore of the body portion and the second locking surface engages the upwardly extending locking surface of the body portion so as to secure the locking member to the body portion; and fixing means for fixing the locking member in the closed position.

The upwardly directed locking surface directly engages the locking member, in contrast to the system of LeFleur in which the upwardly directed surface of the ring engages the screw. This provides a more secure connection. Preferably the connection is strong enough to enable part of the full weight of the downhole to be lifted by lifting the body portion.

Typically the locking surface of the body portion is substantially horizontal when in use (i.e. the surface is directed substantially vertically). In other words, the normal to the locking surface is substantially parallel to the direction of insertion of the downhole tubular. Alternatively the locking surface of the body portion may have a positive or negative camber.

Preferably the body portion has an outwardly directed projection (e.g. a flange) whose upper surface provides the upwardly directed locking surface, and the locking member is mounted about the projection. Typically the locking member has a recess which receives the projection.

According to a third aspect of the invention there is provided apparatus for coupling a downhole tubular to a pump, the apparatus comprising: a body portion having a bore; a locking assembly for locking the downhole tubular in the bore of the body portion; and an annular sealing member mounted within the bore of the body portion and having a lower surface which engages an upper surface of the downhole tubular when the downhole tubular is received in the bore of the body portion, wherein the body portion and an upper surface of the annular sealing member are arranged so as to at least partially define a chamber which receives high pressure fluid in use so as to force the annular sealing member into engagement against the upper surface of the downhole tubular.

The third aspect of the invention provides a secure seal which reduces the risk of fluid leakage during a pumping operation. A pressure difference is set up across the annular sealing member, when in use, so as to increase the integrity of the seal.

The sealing member may be rigidly fixed to the bore of the body portion, and may flex in response to the fluid pressure so as to force the annular sealing member against the upper surface of the downhole tubular. However preferably the sealing member is slidably mounted in the bore so as to permit the sealing member to translate into sealing engagement with the upper surface of the downhole tubular.

Preferably resilient means (for instance springs) are provided to resiliently bias the annular sealing member towards the upper surface of the downhole tubular.

Preferably the annular sealing member has an upwardly directed flange which further defines the chamber.

Preferably a resilient sealing member is provided to ensure a secure seal. The resilient sealing member may be provided as a separate item, or the annular sealing member may itself be formed of resilient material. The resilient sealing member may engage the top of the downhole tubular (providing a top face seal), the outside of the downhole tubular (providing an external seal), the internal bore of the downhole tubular (providing an internal seal), or all three. Where an internal or external seal is provided, the resilient sealing member preferably has an angled surface so as to provide a wedging action.

According to a fourth aspect of the invention there is provided apparatus for coupling a downhole tubular to a pump, the apparatus comprising: a body portion having a bore; a locking assembly for locking the downhole tubular in the bore of the body portion; and a resilient member arranged between an external surface of the downhole tubular and the bore of the body portion, wherein the resilient member is formed with a chamber for receiving fluid so as to inflate the resilient member into sealing engagement with the external surface of the downhole tubular and the bore of the body portion.

The fourth aspect of the invention provides an inflatable seal which can adapt to different diameter downhole tubulars, or at least ensure a reliable seal. The seal may be inflated hydraulically or pneumatically.

Preferably the chamber is toroidal in shape.

According to a fifth aspect of the invention there is provided apparatus for coupling a downhole tubular to a pump, the apparatus comprising: a body portion having a bore; a locking assembly comprising at least one unitary locking member having a locking surface and an elevator engagement surface, wherein the locking member is movably mounted to the body portion so as to permit the locking member to be moved between an open position in which the downhole tubular can be inserted into the bore of the body portion, and a closed position in which the locking surface engages the downhole tubular so as to lock the downhole tubular in the bore of the body portion; and fixing means for fixing the locking member in the closed position, wherein the elevator engagement surface is arranged so as to be externally accessible when the downhole tubular is locked in place whereby the elevator engagement surface can be engaged by an elevator which supports at least part of the weight of the downhole tubular.

The arrangement of the fifth aspect of the invention makes the locking member(s) externally accessible to enable the weight of the downhole tubular to be transferred to an elevator through the locking member(s).

Preferably the locking member is fitted on the outside of the body portion.

Preferably the locking member is externally accessible from below, and the elevator engagement surface is downwardly directed.

The locking member may be coupled to the body portion by screws, as in the arrangement described by LeFleur et al. However preferably the locking member is coupled as described in the second aspect of the invention.

According to a sixth aspect of the invention there is provided apparatus for coupling a downhole tubular to a pump, the apparatus comprising: a body portion having a bore; at least one locking member movably mounted to the body portion so as to permit the locking member to be moved between an open position in which the downhole tubular can be inserted into the bore of the body portion, and a closed position in which the locking member engages the downhole tubular so as to lock the downhole tubular in the bore of the body portion and takes up at least part of the weight of the downhole tubular; fixing means for fixing the locking member in the closed position; and one or more connectors for transferring the weight of the downhole tubular from the locking member to a support.

This construction enables all or part of the weight of the downhole tubular to be transferred to a support, such as a pair of bails, bypassing the upper part of the body portion.

The locking member may slide or pivot to one side so as to permit the downhole tubular to be inserted into the bore of the body portion. Alternatively the locking member may comprise one or more slips which engage an external surface of the downhole tubular.

The locking member may be pivotally mounted to the body portion, for instance by a pivot pin and/or by two or more chains.

The connector typically comprises an aperture or laterally extending lug.

Typically the locking member and connector are sufficiently strong to support a weight in excess of 10,000 kg, preferably 100,000 kg.

According to a seventh aspect of the invention there is provided apparatus for coupling a downhole tubular to a pump and transmitting drilling torque to the downhole tubular, the apparatus comprising: a body portion having a bore; a locking assembly for locking the downhole tubular in the bore of the body portion; a gripping assembly for gripping an external surface of the downhole tubular; and means for transmitting drilling torque from the body portion to the gripping assembly.

Typically the means for transmitting drilling torque can transmit a torque greater than 30 ft lbs, preferably greater than 250 ft lbs.

In a preferred embodiment the means for transmitting drilling torque comprises a plurality of teeth.

Typically means for actuating the gripping assembly is provided, and is preferable actuable when no fluid is being pumped into the downhole tubular.

The following comments apply to all aspects of the invention, where applicable.

Preferably the downhole tubular has a terminal collar which is received in the bore of the body portion. The terminal collar may be integral with the downhole tubular or may be screwed on as a separate item.

Preferably the locking member is substantially C-shaped in cross-section.

Preferably at least two locking members are provided. The locking members may pivot or translate between the open and closed positions.

Preferably the locking member(s) form an annular ring when in the closed position.

Typically a resilient seal member is mounted in the bore of the body portion and seals against the tubular member when the tubular member is received in the bore.

Preferably the resilient seal member has a plurality of projections which engage the tubular member when the tubular member is received in the bore. Preferably the projections are angled in the direction of insertion of the cylindrical member. Typically the projections are in the form of circumferentially extending ribs.

According to an eighth aspect of the invention there is provided a joint comprising a downhole tubular received in a borehole; a pump tubular; and apparatus coupling the downhole tubular to the pump tubular, the apparatus comprising a body portion with a first bore receiving the downhole tubular and a second bore receiving the pump tubular, and a locking assembly locking the downhole tubular in the first bore of the body portion, wherein the apparatus is constructed so as to permit relative axial movement between the pump tubular and the downhole tubular.

The eighth aspect of the invention provides a flexible joint between a downhole tubular, and a pump tubular. When in use, the pump tubular directs fluid from a pump into the downhole tubular. By allowing relative axial movement between these two parts, we reduce the chance of breakage in the event that the downhole tubular sticks when it is being lowered into a borehole.

The pump tubular is preferable received in the downhole tubular. This reduces the chance of leakage.

In one embodiment the joint further comprises a resilient member coupling the pump tubular to the body portion and providing a resilient biasing force which acts along the length of the pump tubular. A variety of resilient members may be used, but in a preferred example the resilient member comprises a coil spring wrapped around the pump tubular and coupled at a first end to the body portion and at a second end to the pump tubular.

The resilient member is preferably housed at least partially in the first bore of the body portion.

The invention also extends to a method of pumping fluid into a downhole tubular, the method comprising: coupling the downhole tubular to a pump tubular using apparatus according to any aspect of the present invention; and pumping fluid from the pump tubular into the downhole tubular.

The tubulars are typically circular in cross-section, although it will be understood that other cross-sectional shapes may be possible. Therefore the expression 'tubular' should be construed broadly in this specification, covering any elongate member having a bore formed along its length.

In a typical application the downhole tubular is a drill pipe, casing or other tubing for a borehole such as an oil or gas well.

A ninth aspect of the invention provides a method of drilling comprising: engaging an external surface of a length of casing with a gripping assembly; drilling a hole by transmitting torque via the gripping assembly to a drilling bit mounted on an end of said casing; and sealing said casing in the drilled hole.

Typically pumping fluid is directed into the casing during drilling, and the casing is subsequently sealed in the borehole by pumping sealing fluid into the casing.

Various embodiments of the present invention will now be described by way of example with reference to the accompanying drawings in which:

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 is a plan view of an alternative apparatus with the locking assembly in its open position;

DETAILED DESCRIPTION

Figure 1:
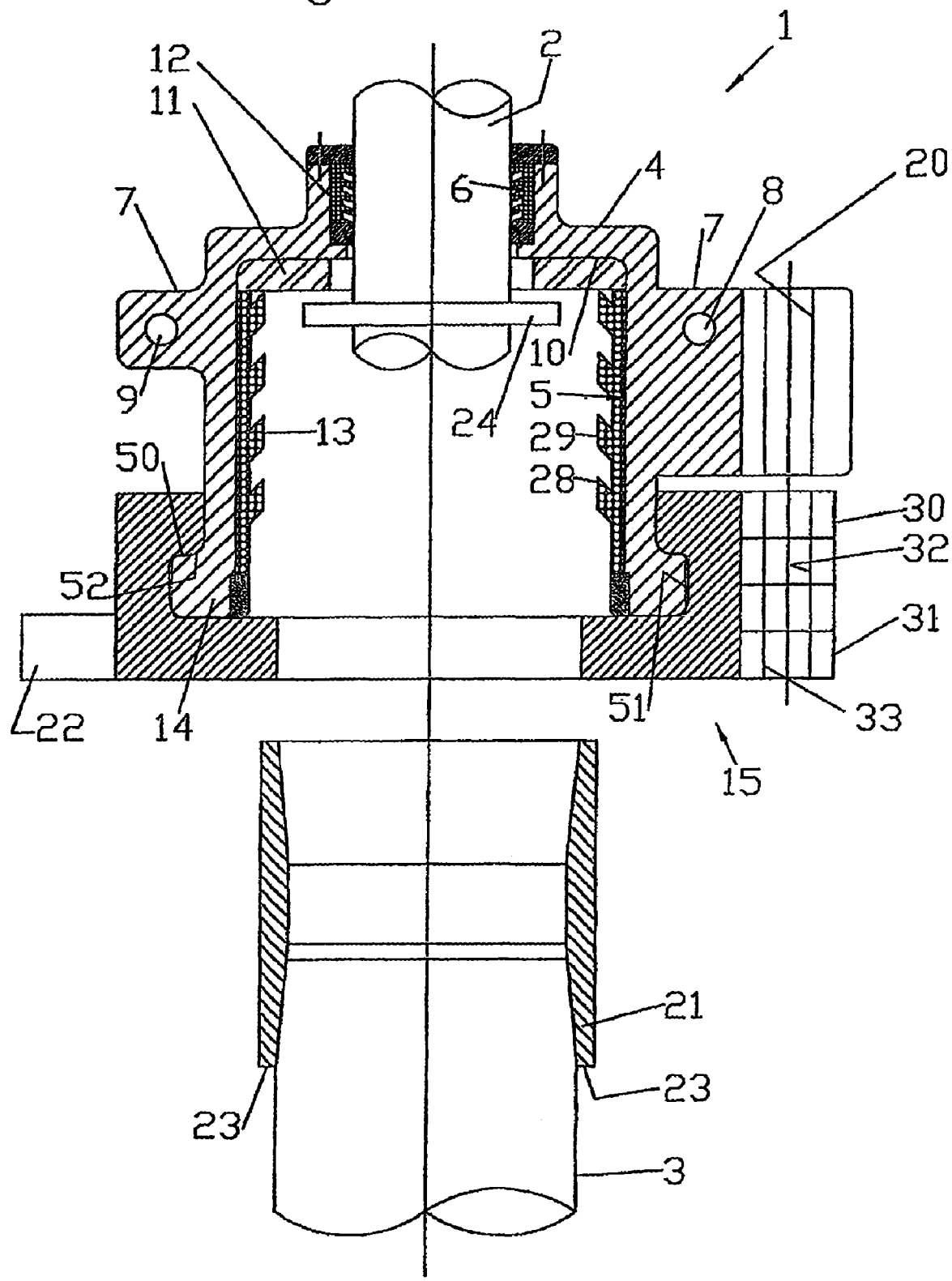
FIG. 1 is a cross-sectional side view of a top circulating head and borehole casing prior to connection.

Referring to FIG. 1, the top circulating head is designated by numeral 1, and is used to couple a slick joint 2 with a bore hole casing 3.

The assembly 1 comprises a main body portion 4 having a large cylindrical bore 5, a small cylindrical bore 6 and a flange portion 7 with a pair of lifting lug holes 8, 9. Shoulder portion 10 between bores 5 and 6 supports a bumper ring 11 made of rubber or a similar material. Resilient (e.g. rubber) external seals 12 and 13 are mounted in the bores 5 and 6. A locking assembly 15 is mounted on the body portion 4 about an outwardly extending flange 14.

Figure 2:
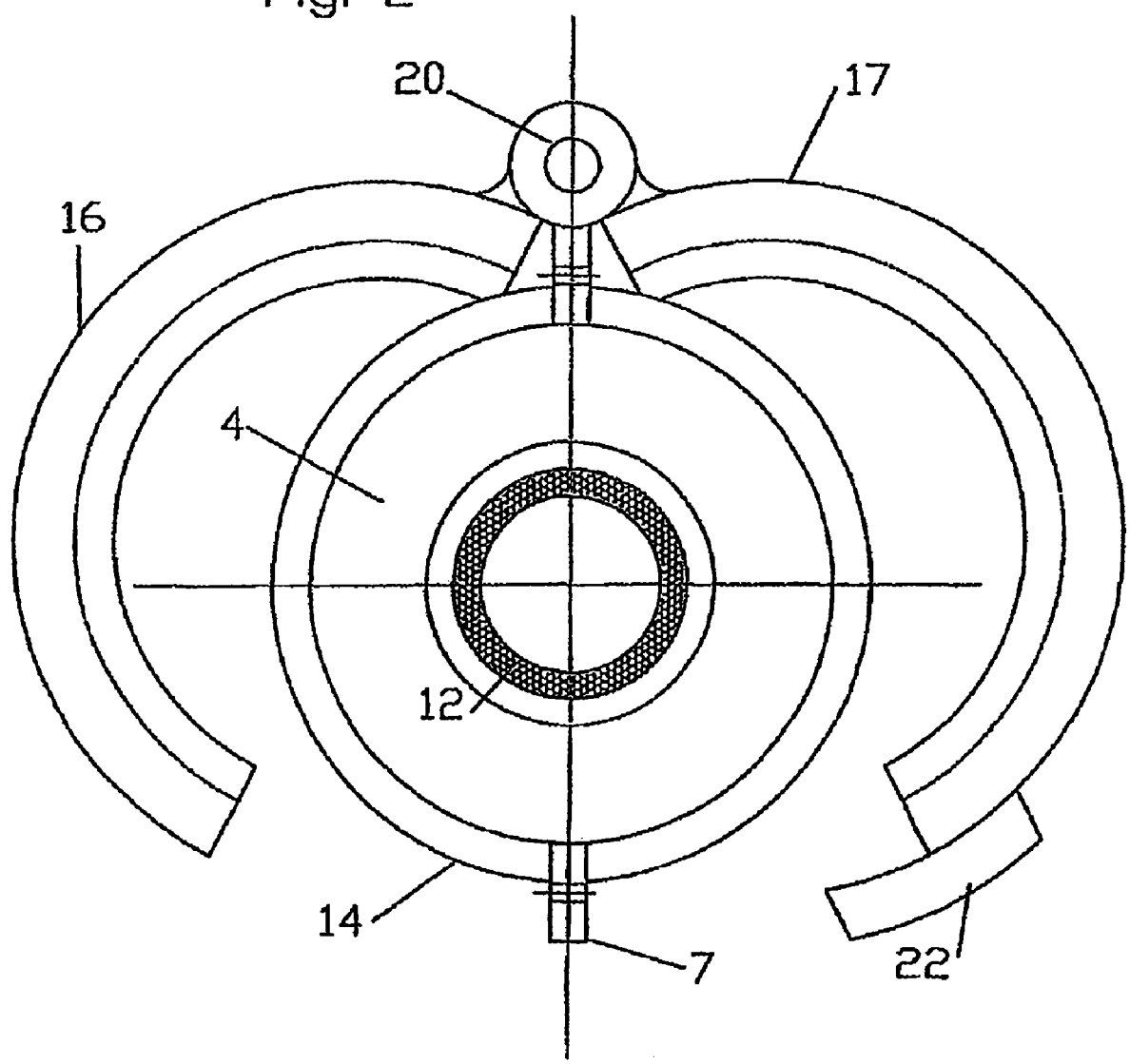
FIG. 2 is a plan view of the apparatus of FIG. 1, with the doors in their open position.

Referring to FIG. 2, the locking assembly 15 has a first semicircular door 16 and a second semicircular door 17. The doors 16, 17 each have respective hinge rings 30, 31 (FIG. 1) with bores 32, 33 aligned with a bore 20 in the flange 7. A pivot pin (not shown) passes through the bores 20, 32 and 33.

The main body portion 4 has an outwardly extending flange 14 which is received in an inwardly facing recess 51 formed in the doors 16, 17. The flange 14 has an upper locking surface 50 which engages a locking surface 52 provided by the upper wall of the recess 51.

The casing 3 is screwed into a terminal collar 21. Prior to insertion of the casing 3 and collar 21, the doors 16, 17 (shown in their closed positions in FIG. 1) are pivoted to the open positions shown in FIG. 2. This permits the insertion of the terminal collar 21 into the bore 5.

Figure 3:
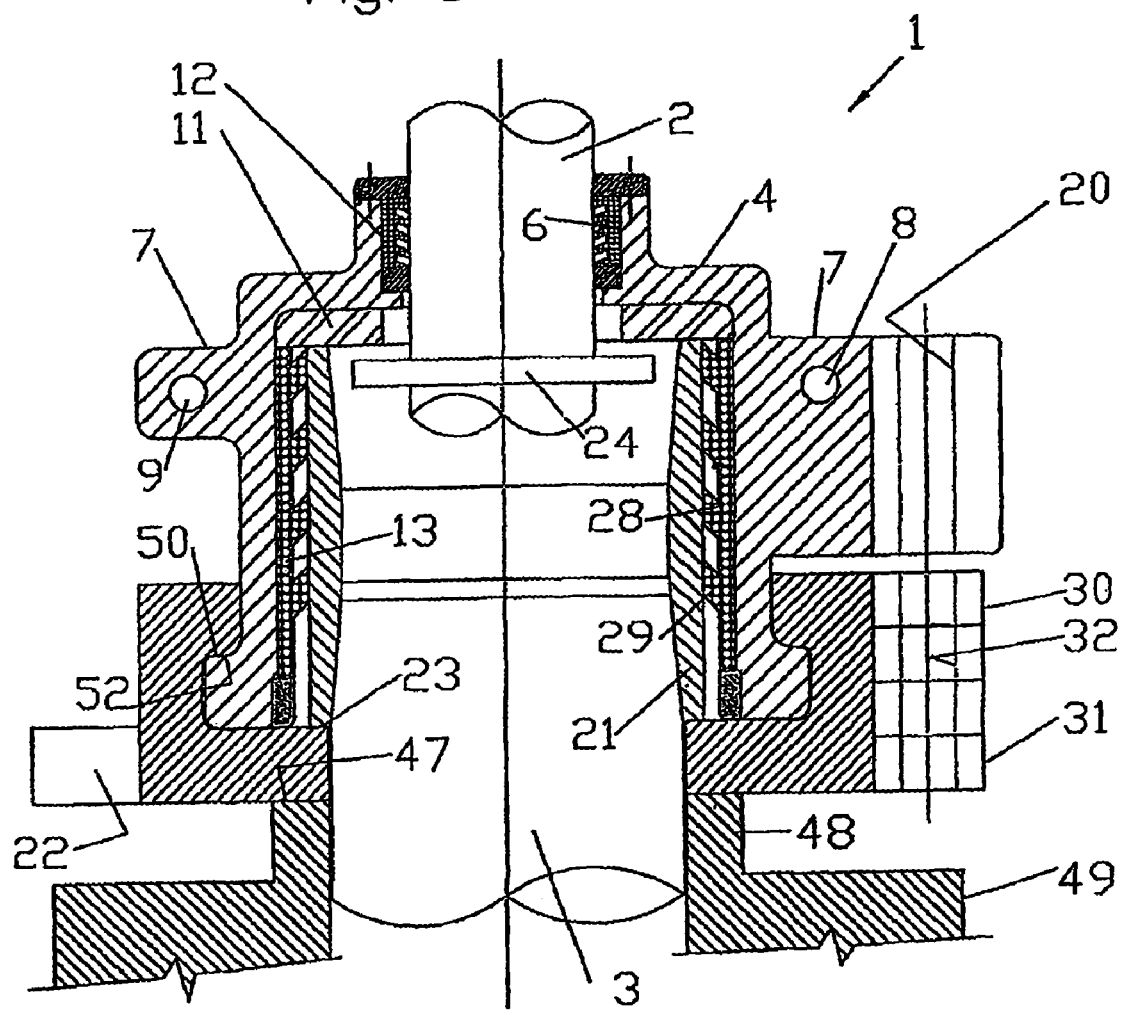
FIG. 3 is a cross-sectional side view of an assembled joint.
Figure 4:
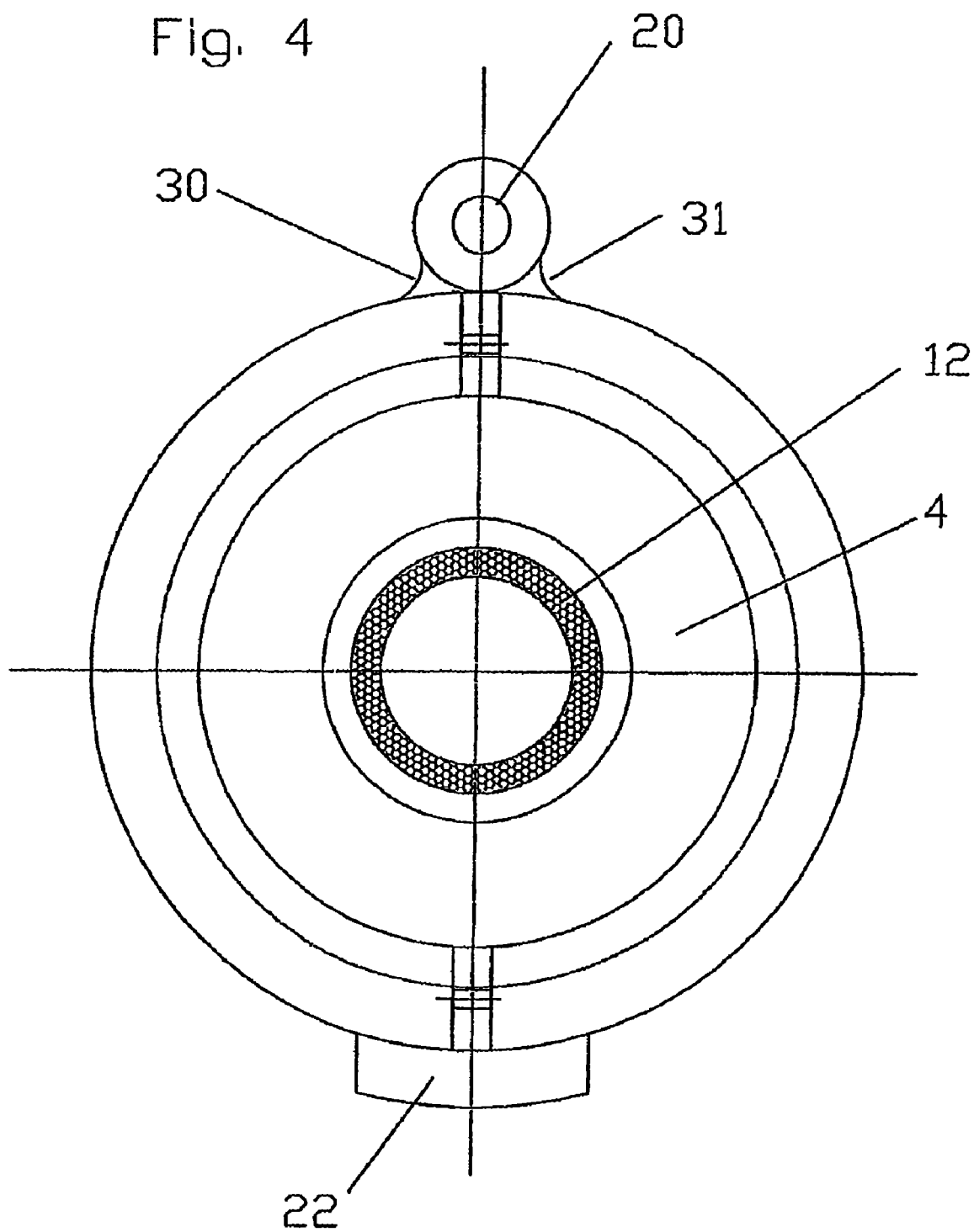
FIG. 4 is a plan view of the assembled joint of FIG. 3.
Figure 5A:
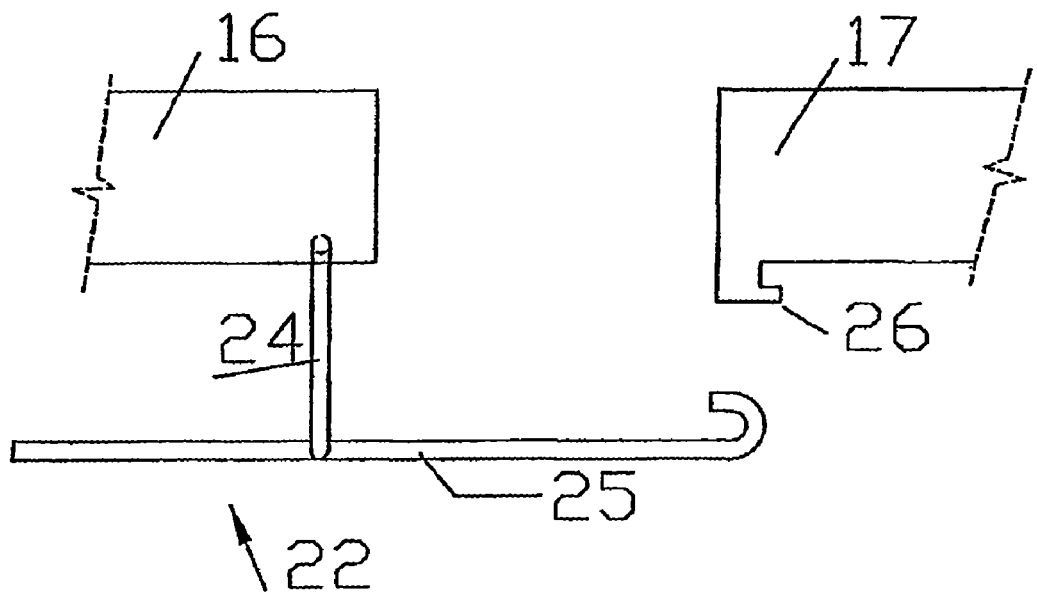
FIG. 5a is a side view of a lever clamp mechanism.
Figure 5B:
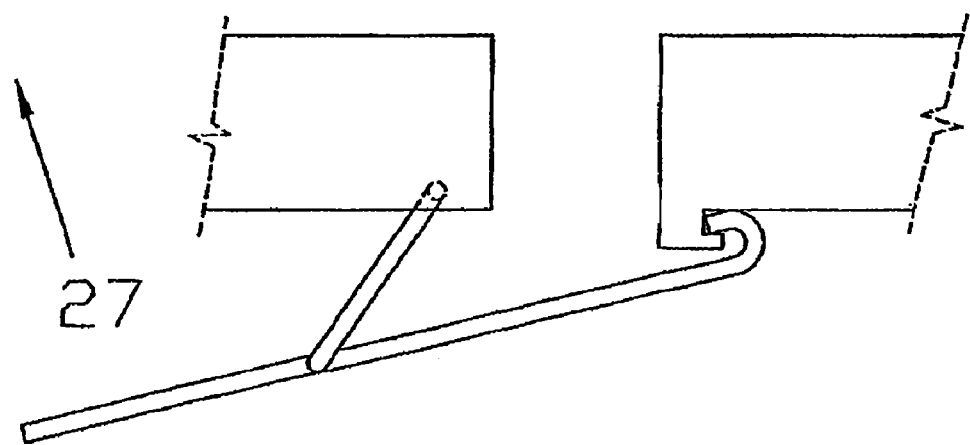
FIG. 5b shows the lever clamp mechanism of FIG. 5a being used to clamp the locking members together.

Referring to FIGS. 3 and 4, when the terminal collar 21 has been fully inserted against the bumper plate 11, the doors 16, 17 are pivoted to their closed positions shown in FIGS. 3 and 4 and clamped together by a lever clamp mechanism 22. The action of the mechanism 22 is shown schematically in FIGS. 5a and 5b. The mechanism comprises a lever arm 24 pivoted at one end to the door 16 and at the other end to a clip 25. As shown in FIG. 5b, the clip 25 is hooked round a catch 26 on the door and snapped shut as indicated by arrow 27 in FIG. 5b. This forces the doors 16,17 together and ensures a secure connection.

Referring to FIG. 3, in their closed positions the doors 16, 17 engage a shoulder 23 of terminal collar 21 so as to lock the casing 3 in place. The terminal collar 21 also engages resilient external seal 13 so as to provide a fluid tight seal. The seal 13 has circumferential ribs 28, 29 etc which are angled in the direction of insertion of the casing 3. Similarly, the slick joint 2 engages a resilient external seal 12 with reverse-directed ribs for a fluid tight seal. The slick joint 2 has a support flange 24 which engages the bumper ring 11 when the slick joint 2 is used to lift the casing 3 or to lower the casing 3 into a borehole. Alternatively, the slick joint 2 can be pushed downwards into the casing 3.

The seal 12 is mounted in the bore 6 between a pair of phosphor-bronze bushes. The bushes and slick joint are highly polished in order to minimize friction. A lubricant may also be provided.

The coupling apparatus 1 provides a fluid-tight seal between the slick joint 2 and casing 3, permitting fluid to be pumped at high pressure into the casing 3. After the pumping operation is finished, the clamping mechanism 22 is released and the doors 16, 17 are pivoted to their open positions. The assembly 1 is then lifted up by the slick joint 2 or by the lug holes 8, 9.

Part of the weight of the casing 3 can be supported by the slick joint 2, due to the secure connection provided by the substantially horizontal locking surface 50 which supports the opposed substantially horizontal surface 52 of the doors 16, 17. Although a horizontal locking surface 50 is provided on the flange 14, the surface 50 may have a positive or negative camber. If a positive camber lie sloping to the outside) is provided, then a stronger clamping mechanism 22 will be required to keep the two members 16, 17 together.

Although part of the weight of the casing can be supported by the slick joint 2 as discussed above, the majority of the weight of the casing 3 is supported by a side door elevator 49 which has a flange 48 with an upper surface 47 which engages the bottom surfaces of the members 16, 17.

Figure 8:
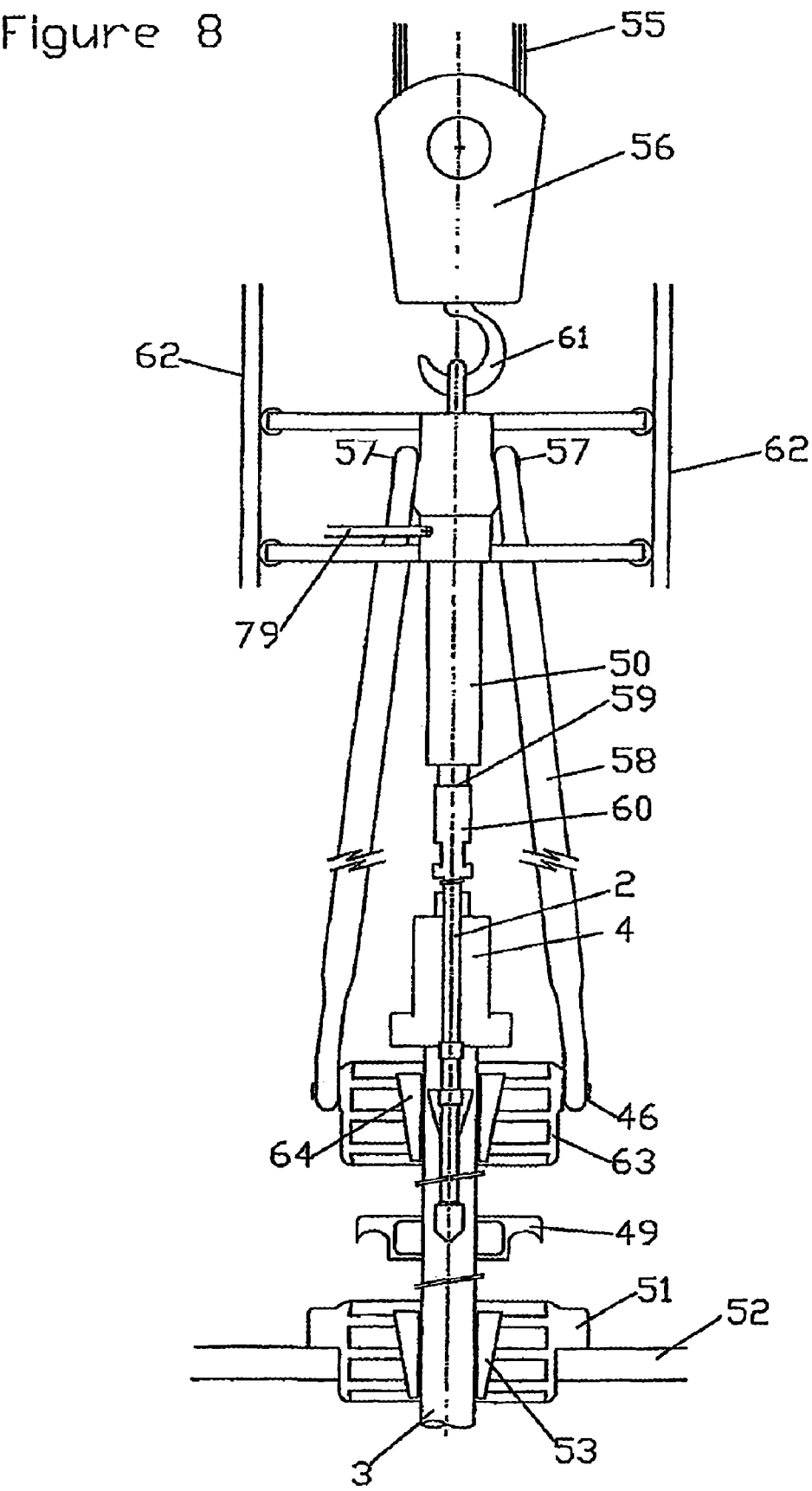
FIG. 8 is a cross-sectional view of an oil rig lowering casing into a borehole.

The elevator 49 is coupled to a rig (not shown) in the manner shown in detail in FIG. 8.

The assembly 1 may be rotated with respect to the slick joint 2.

In an alternative arrangement the elevator 49 may be omitted and the weight of the casing 3 transferred to a rig (not shown) by bails (also not shown) attached to the lug holes 8, 9. In this case the locking assembly 15 (which effectively functions as an elevator) may need to be reinforced so as to support the weight of the casing 3 (which may be many hundreds of tons). Instead of transferring the weight via the lug holes 8, 9, the assembly 15 may have lug holes or rings for attachment to the bails.

An alternative assembly is shown schematically in FIG. 6. In this case the locking assembly comprises a pair of members 40, 41 which are identical to the doors 16, 17 in cross-section (apart from the omission of the hinge rings 30, 31). The members 40, 41 are mounted on rams 42, 43 which are driven by hydraulic cylinders 44, 45 so as to translate the members between the open position shown in FIG. 6, and a closed position (not shown).

Figure 7:
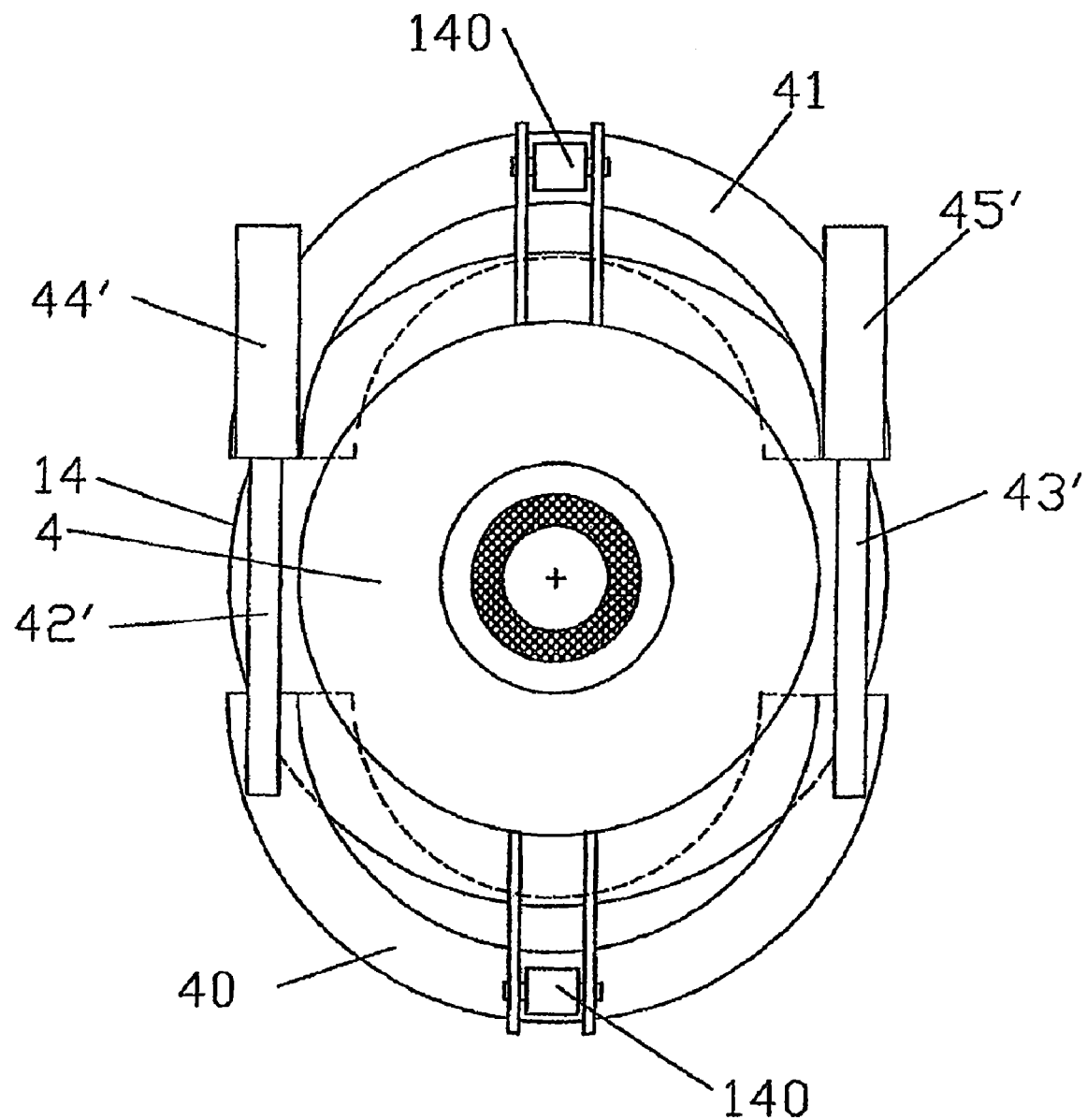
FIG. 7 is a plan view of a further alternative apparatus with the locking assembly in its open position.

In a further alternative shown schematically in FIG. 7, the cylinders 44', 45' are attached to member 41 and the rams 42', 43' are attached to the opposite member 40. It can be seen that the system of FIG. 7 is fully self contained, in the sense that no external mounting is required. In contrast, in the system of FIG. 6, the cylinders 44, 45 must be mounted on external supports.

A cross-section through an oil rig is shown in FIG. 8. In an initial drilling operation the rig is used to drill a borehole with a drill pipe (not shown) which is rotated by a top drive 50 or a rotary table 51. Following drilling, a casing pipe 3 is passed along the length of the borehole.

Starting from the top of FIG. 8, a set of suspension wires 55 are coupled to a support structure (not shown). The wires 55 carry a block 56 with a hook 61 which support the top drive 50. The top drive 50 has a drive shaft 59 and is prevented from rotating by a pair of rails 62 mounted on a derrick (not shown).

A slick joint 2 is coupled to the drive shaft 59. A mud supply pipe 79 is provided to pass mud at high pressure through the slick joint 2.

In contrast to FIG. 3, the weight of the casing is supported by a slip type elevator 63 (instead of a side door elevator) which has slips 64 which grip the sides of the casing 3. The slip type elevator 63 has a pair of side lugs 46 which are supported by the bails 58. Thus the weight of the casing 3 is transferred to the block 56 by the bails 58 via the elevator 63, bypassing the slick joint 2. Part of the weight of the casing 3 can also be supported, if necessary, by the slick joint 2. The slick joint 2 is coupled to the drive shaft 59 by a frangible coupling 60 incorporating shear pins which break if the load carried by the slick joint 2 exceeds a set threshold.

Figure 9:
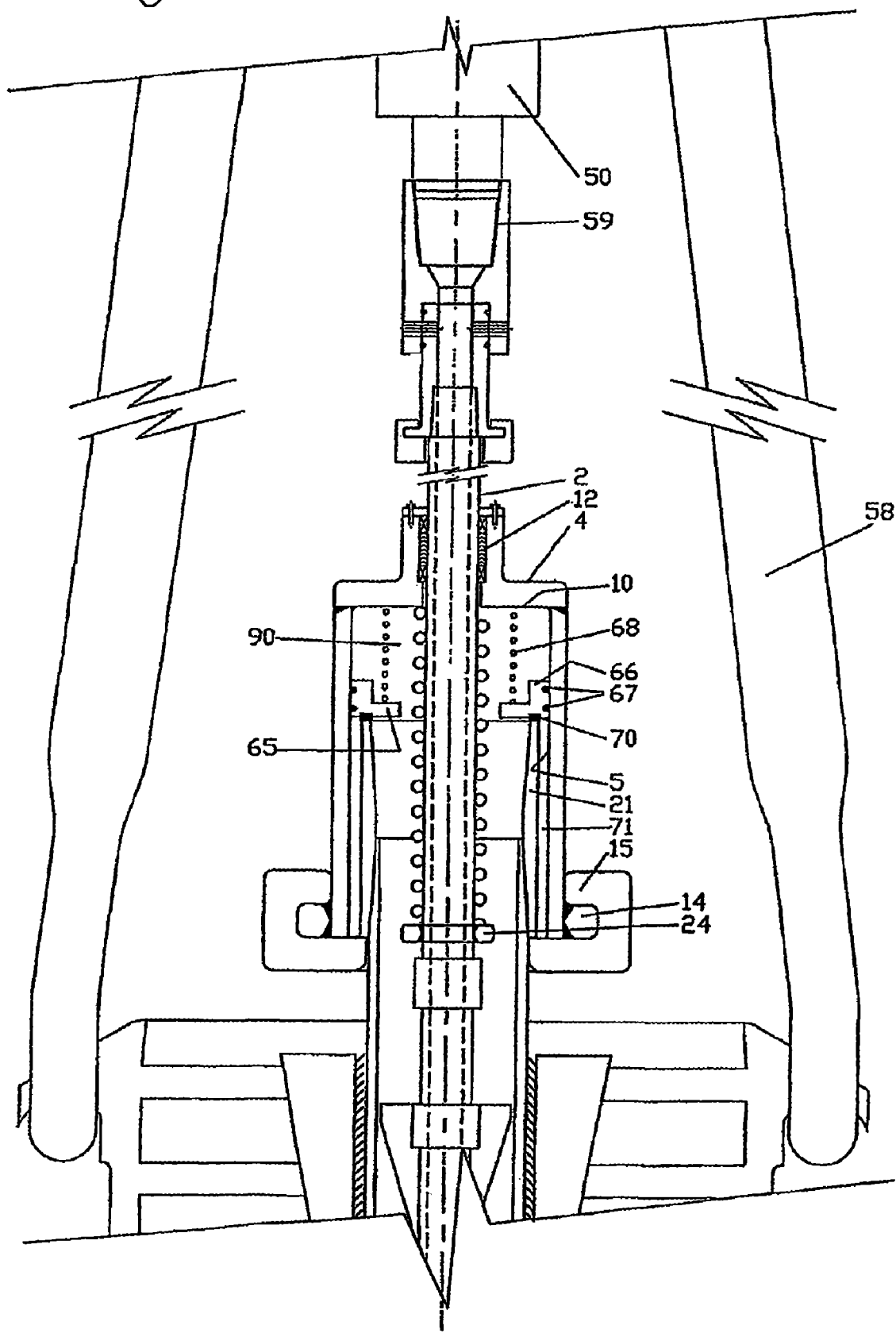
FIG. 9 is a cross-sectional side view of a top circulating head having a top face seal.
Figure 12:
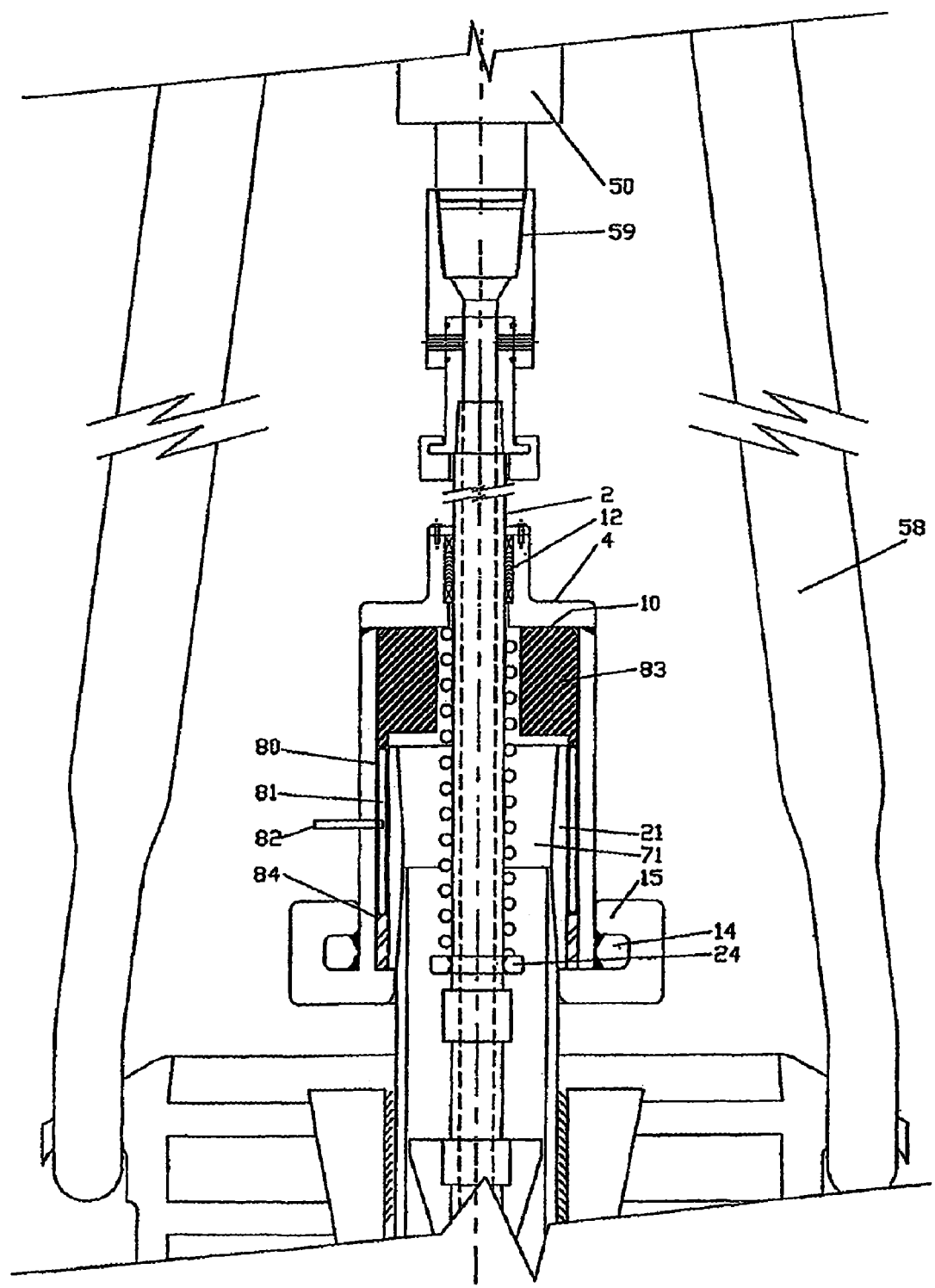
FIG. 12 is a view similar to FIG. 9 showing a top circulating head with an inflatable seal.

Various different types of top circulating head configuration are shown in FIGS. 9 12. Components with a similar function are given the same reference numerals as the equivalent components in FIGS. 1 and 3.

The bumper ring 11 shown in FIG. 1 is replaced in FIGS. 9 12 with a sliding piston-type bumper ring 65 with a flange 66 which slides up and down the bore 5 sealed by resilient seals 67. The ring 65 is coupled to the shoulder portion 10 and biased downwards by a coil spring 68.

In the embodiment of FIG. 9, the ring 65 carries a resilient annulus of material 70 on its lower face to form a top face seal which engages the top of the collar 21.

When mud is pumped into the casing 3, mud at high pressure (up to 2500 psi) fills the chamber 90 defined by the upper face of the bumper ring 65, internal and upper faces of flange 66, bore 5 and shoulder 10. In contrast, the chamber 71 below the ring 65 is free of mud. This sets up a fluid pressure differential which forces the top face seal 70 against the collar 21 and ensures a tight seal.

Figure 10:
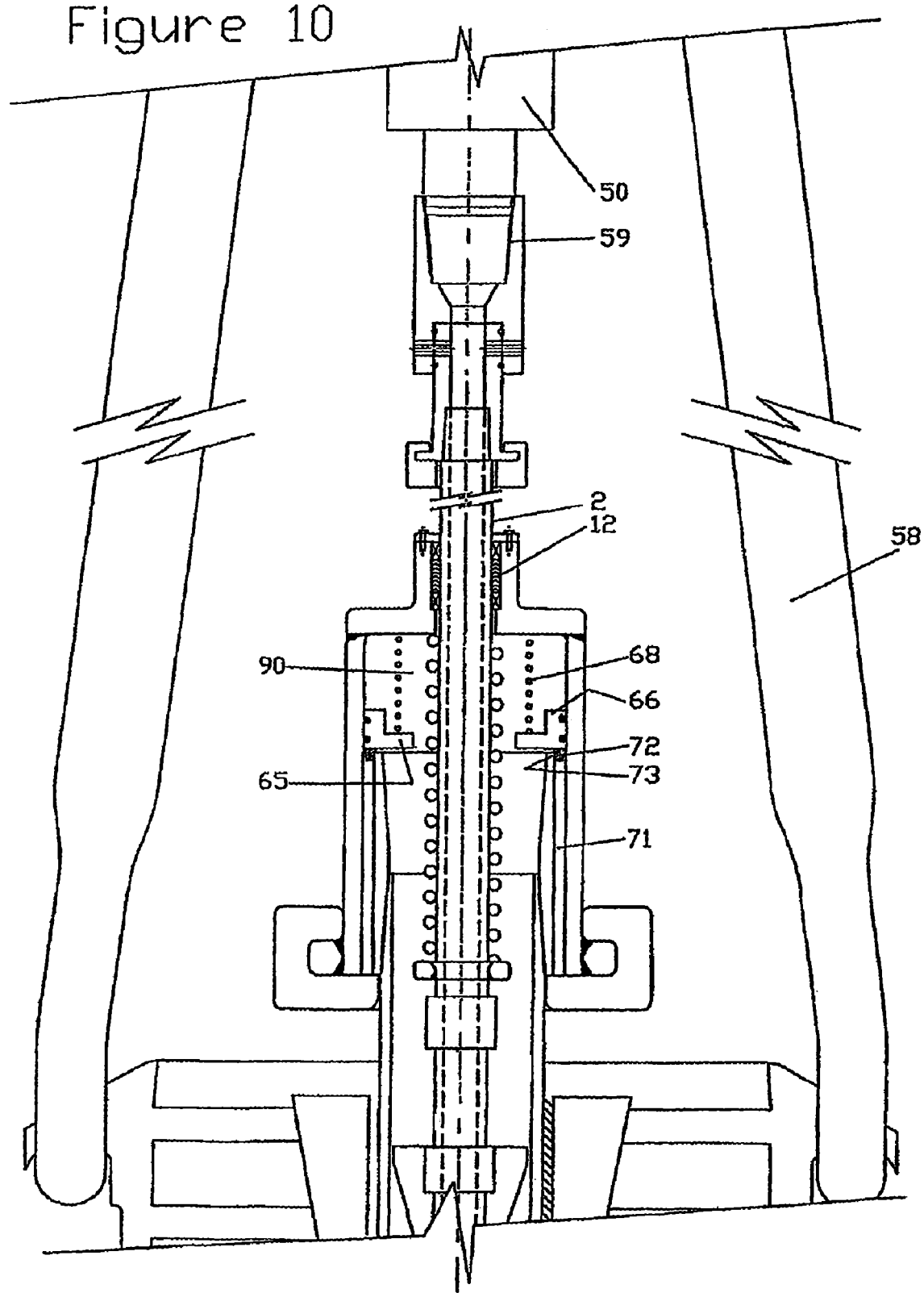
FIG. 10 is a view similar to FIG. 9 showing a top circulating head with an external seal.

In an alternative arrangement shown in FIG. 10, the top face seal is replaced with an external seal formed by an annulus of resilient material 72 with a frustoconical inner surface 73 which provides a wedging action when the bumper ring 65 forces the annulus 72 down into the chamber 71.

Figure 11:
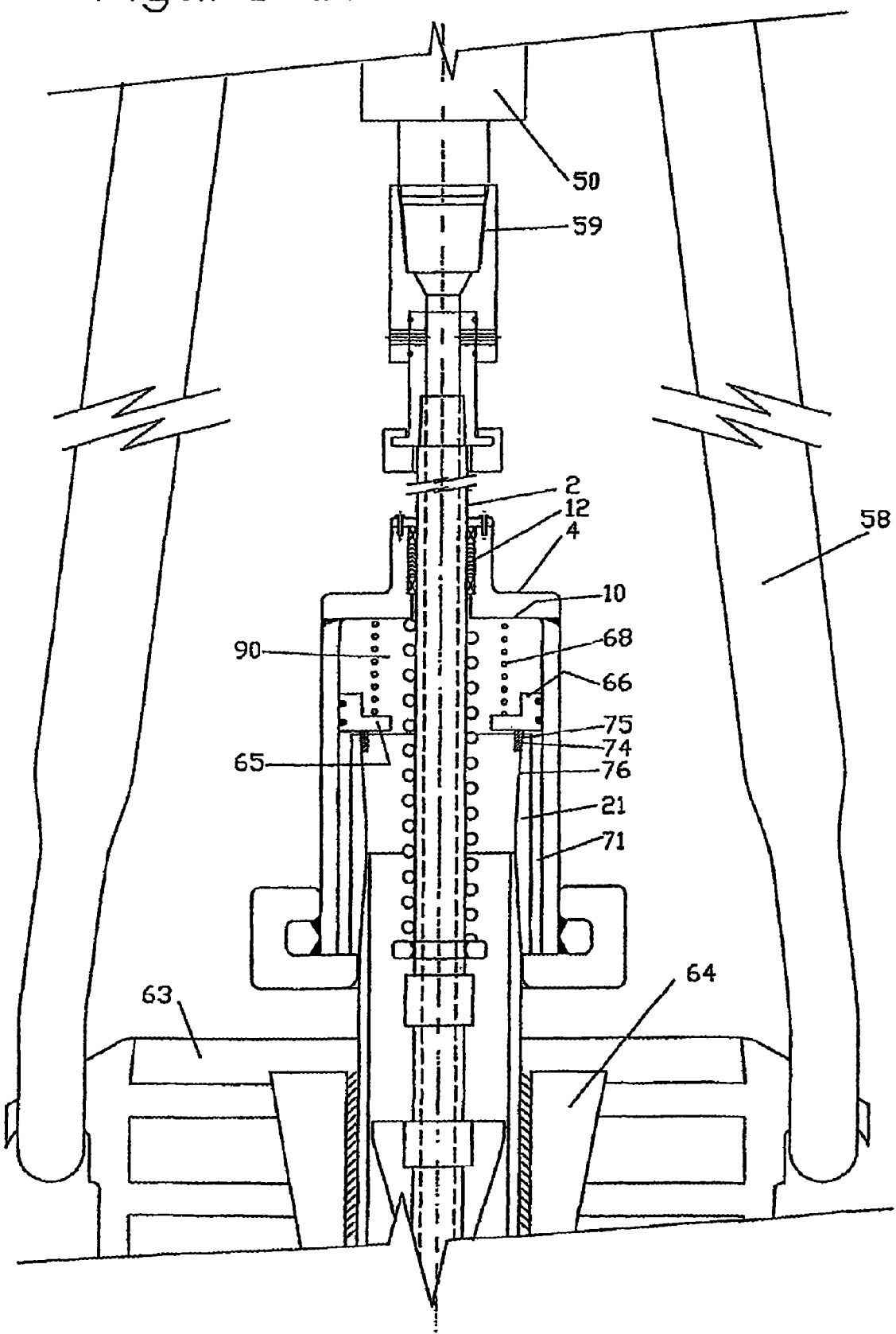
FIG. 11 is a view similar to FIG. 9 showing a top circulating head with an internal seal.

In a further alternative arrangement shown in FIG. 11, the top face seal is replaced with an internal seal formed by an annulus of resilient material 74 with a frustoconical outer surface 75 which engages the internal bore 76 of the collar 21 and provides a wedging action when the bumper ring 65 forces the annulus 74 down into the collar 21.

In a further alternative arrangement shown in FIG. 12, the seal 13 (FIG. 1) is replaced by a hydraulic seal, comprising a hollow torus of rubber (or similar) material 80 with a toroidal chamber 81 which is supplied with hydraulic fluid from a line 82. Anti extrusion rings 83, 84 are provided to prevent the seal 80 from extruding up or down when inflated. The seal 80 engages the collar 21 and bore 5 when inflated. This enables collars 21 with differing diameters to be accommodated.

Figure 13:
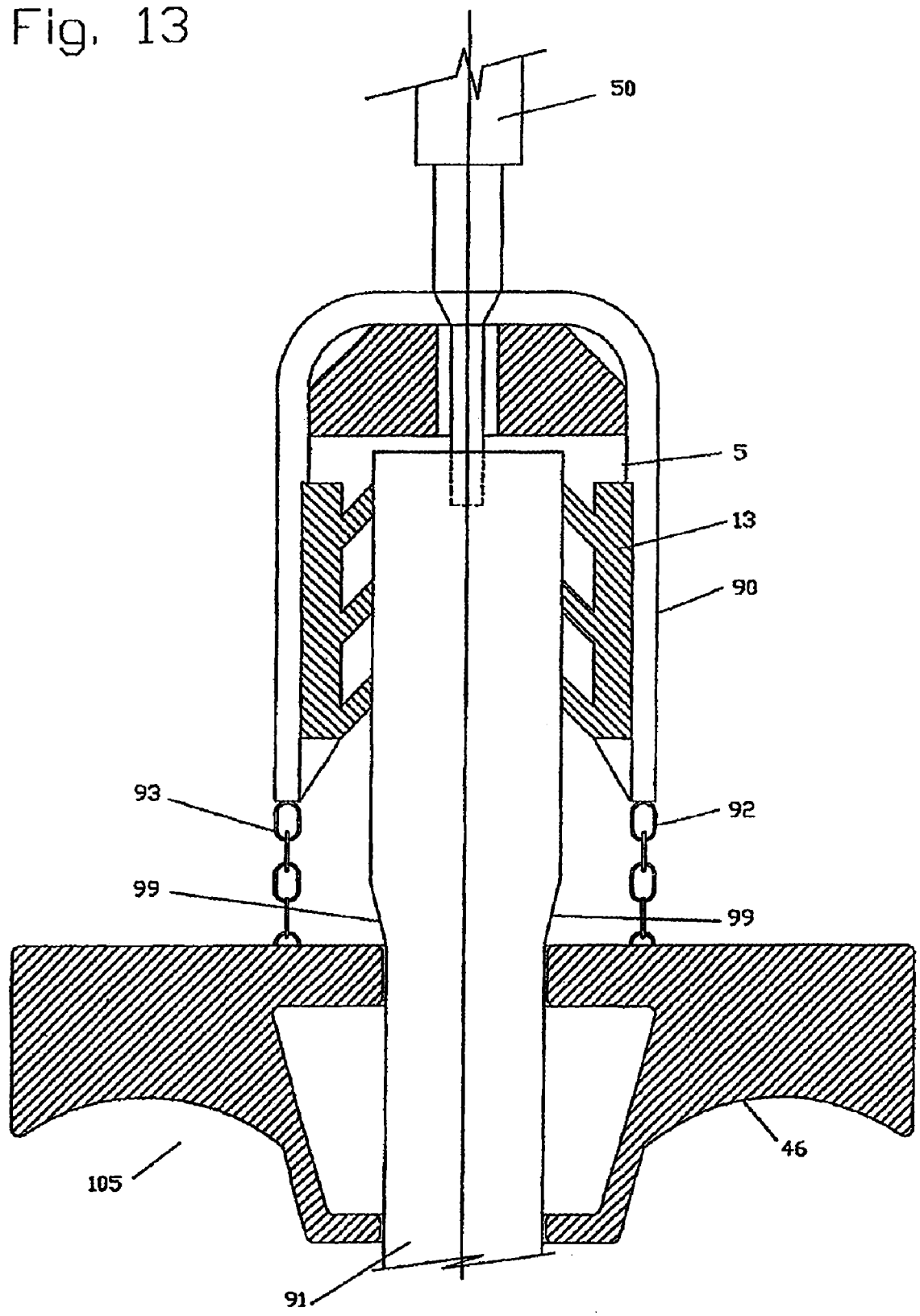
FIG. 13 shows an alternative top circulating head incorporating an elevator assembly attached.

Referring to FIG. 13, an alternative top circulating head is shown, comprising a body portion 90 with a seal 13 of the type described in FIG. 1. A casing tube 91 is received in the bore 5 of the body portion 90 and a seal is effected by the seal 13. A side door elevator 105 is suspended from the bottom of the body portion 90 by a pair of chains 92, 93. For purposes of clarity, the chains 92, 93 are showed in FIG. 13 with only four links. However, in practice a larger number of links will be required.

In contrast to the embodiments of FIGS. 1 12, the tubular shaft extending down from the top drive 50 is rigidly connected (for example by welding) to the body portion 90.

Figure 14:
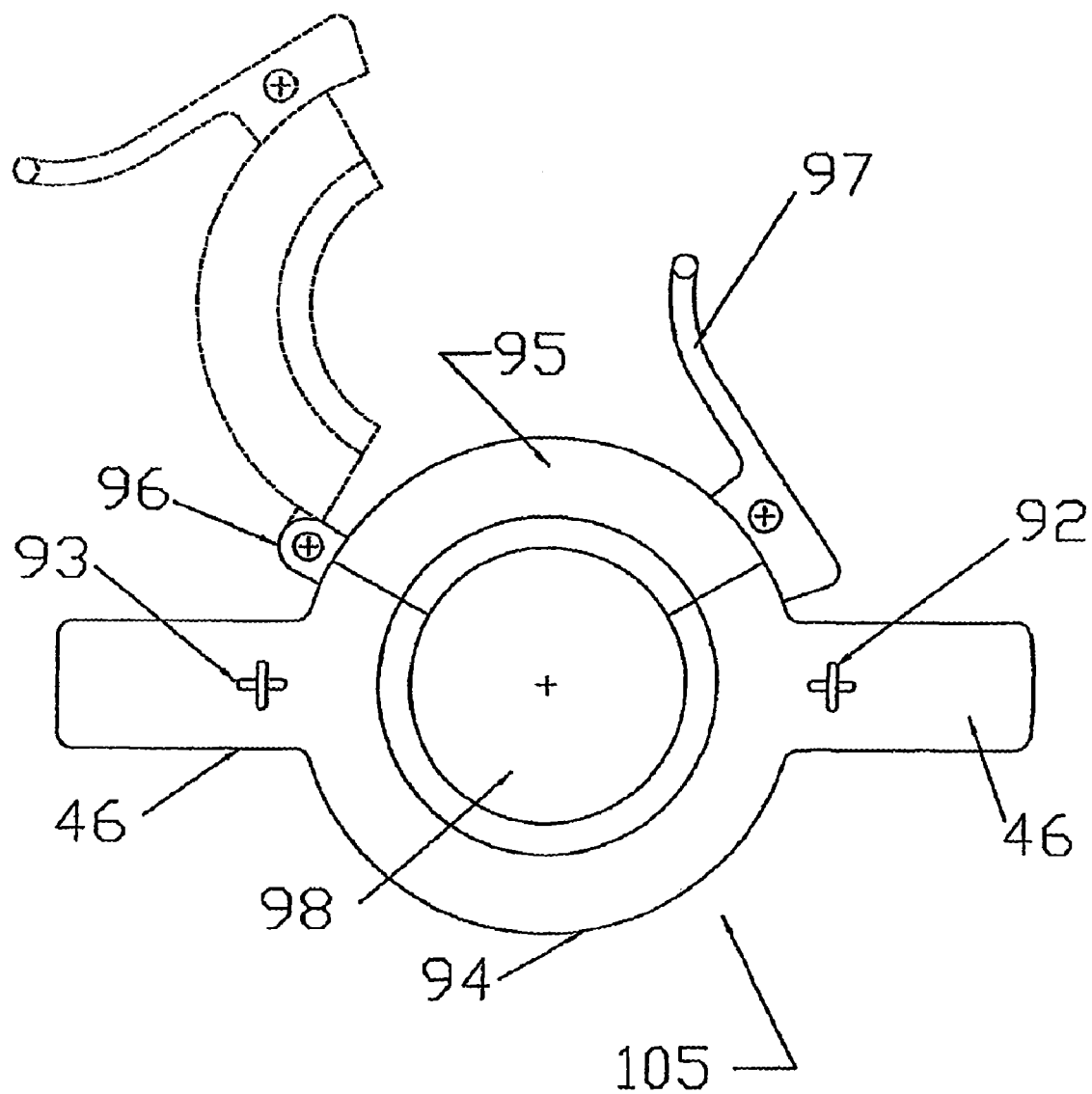
FIG. 14 is a plan view of the side door elevator shown in FIG. 13

As shown in FIG. 14, the elevator 105 comprises a main body portion 94 attached to a door 95 via a hinge 96. The door 95 is locked in place by a connector 97. The connector 97 can be released to permit the door 95 to swing back to the open position shown in dotted lines in FIG. 14. Prior to insertion of the casing 91, the elevator 105 (with door 95 in its open position) is swung away from the mouth of the bore 5 on the chains 92, 93.

Once the casing 91 has been fully inserted into the bore 5, the elevator 105 is swung back and the casing 91 is received in the bore 98 of the elevator. The door 95 is then swung back into place and locked by connector 97. The casing 91 has a shoulder 99 which is engaged by the elevator 105 to support the weight of the casing 91. The weight of the casing 91 is transferred to a rig (not shown) via lugs 46 and bails (not shown). This prevents the weight of the casing 91 being transferred through the chains 92 and 93.

Figure 15:
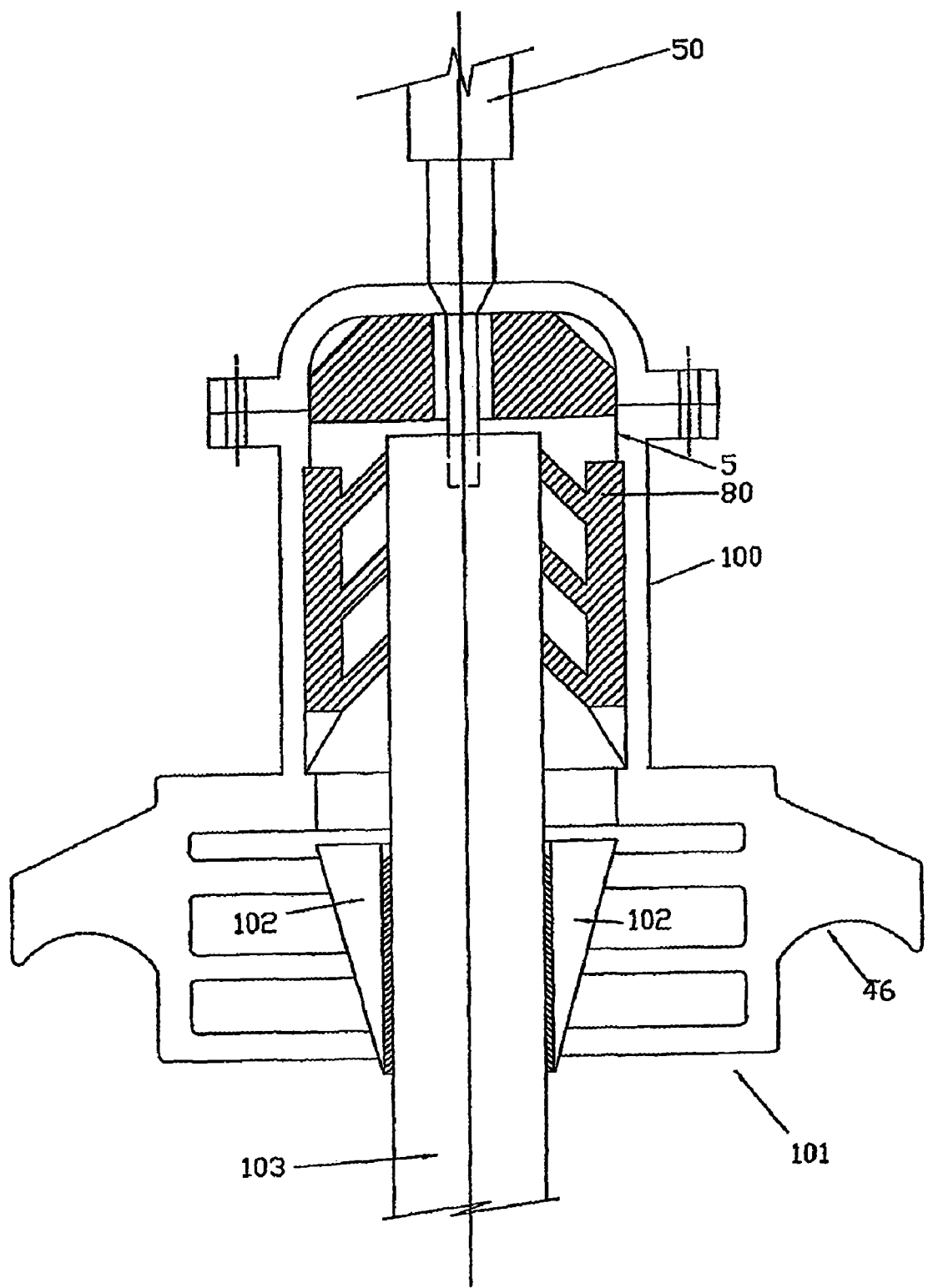
FIG. 15 is a cross-sectional view of a further alternative arrangement incorporating a slips type elevator.

In the alternative embodiment of FIG. 15, the side door elevator 105 of FIG. 13 is replaced with a slip type elevator. In this case, the body portion of the top circulating head comprises a first portion 100 with a bore 5, and a second, elevator portion 101 (formed as a single piece with the portion 100, or attached e.g. by welding). Slips 102, in the form of up to eight blades or wedges, are mounted inside elevator portion 101 and are slid upwards into the bore 5 to permit the casing 103 to pass through the elevator portion 101 into the bore 5. The slips may be lifted by a hand lever, pneumatic or hydraulic cylinder (not shown). The slips 102 then retract downwards as they take the weight of the casing 103.

It can be seen in FIG. 15 that the use of a slip type elevator enables casing 103 with no terminal collar to be supported. However, the slips 102 can be moved apart if necessary sufficiently to enable casing with a terminal collar (such as the terminal collar 12 of FIG. 1) to be inserted.

Figure 16:
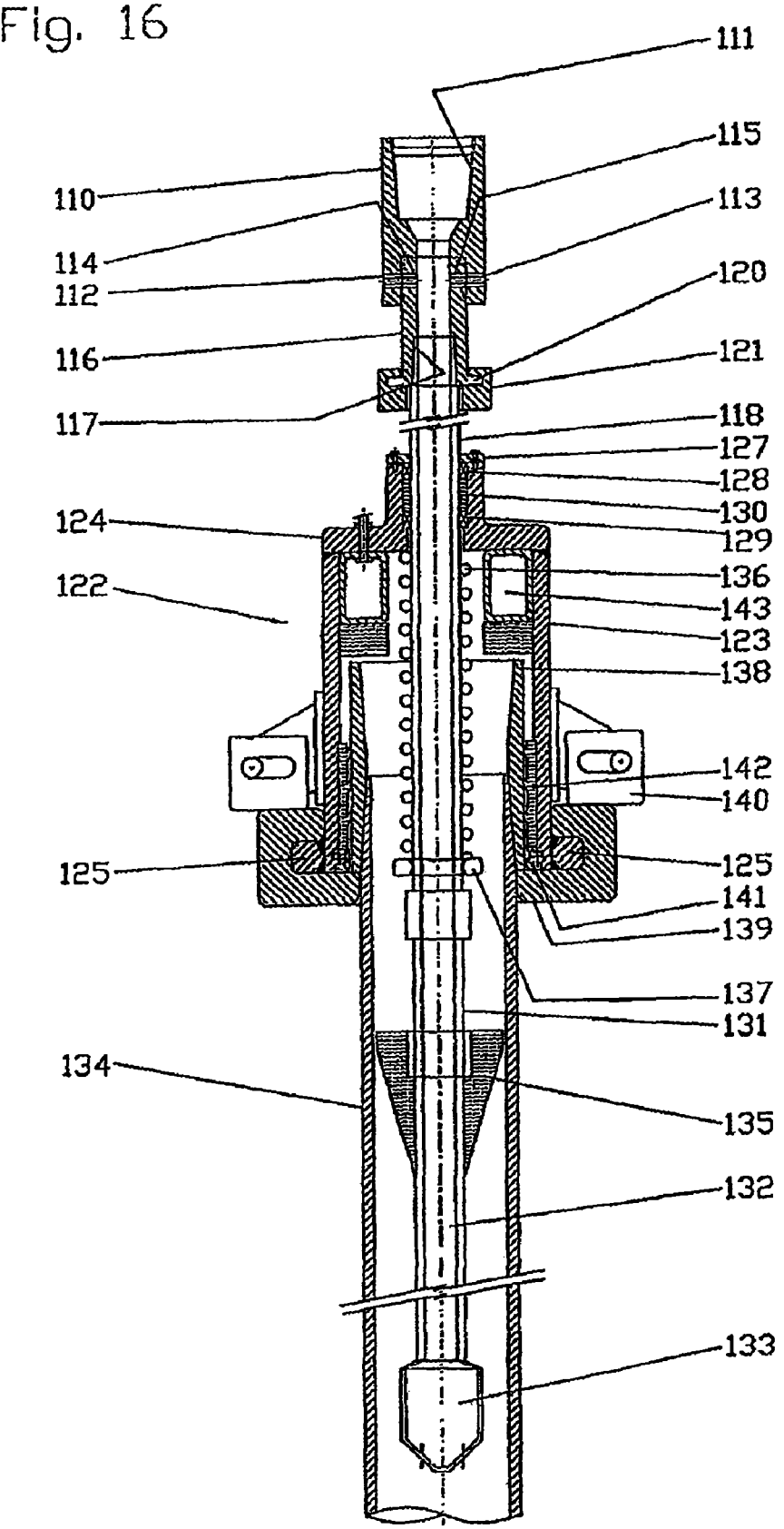
FIG. 16 is a cross-sectional view of an alternative top circulating head system viewed from the right-hand side.

An alternative top circulating head assembly is shown in FIG. 16. A top drive connection 110 has an internally threaded bore 111 which receives a top drive shaft (not shown). The internal bore 111 enables mud to be pumped through the top drive connection 110. The top drive connection 110 has a pair of bores 112, 113 which receive shear bolts (not shown). The bores 112, 113 are aligned with bores 114, 115 in a connector 116. The shear bolts pass through the bores 114, 115 and provide a frangible connection between the connector 116 and top drive connection 110. The connector 116 has an internally threaded bore 117 which receives a threaded end of a slick joint 118 to rigidly connect the slick joint 118 to the connector 116. The connector 116 has a flange 120 which supports an external saver sub assembly 121.

A bell designated generally at 122 is formed by a tube 123 which is welded to a cap 124 and a flange 125. A keeper plate 127 is bolted to the cap 124. The slick joint 118 engages a pair of phosphor-bronze bearings 128, 129 and a seal 130, which enable the slick joint 118 to slide up and down.

The slick joint 118 is attached at its lower end to a stinger adjustment sub casing 131 which is attached in turn to a stinger 132 with a non drip valve 133 at its lower end. The stinger is received inside casing 134 and is maintained in a central position by an internal guide 135.

A coil spring 136 (shown in its compressed loaded configuration) is mounted between cap 124 and a spring support flange 137 welded to the slick joint 118.

The casing 134 has a terminal collar 138 which is clamped in place with a locking assembly 139 similar to the locking assembly 15 shown in FIG. 1.

A seal locking ring 141 and external seal 142 provide a fluid-tight seal between the components.

The weight of the casing is supported as shown in FIG. 8, that is by a slip elevator 63 and pair of bails 58 (both omitted in FIG. 16 for clarity). The spring 136 allows a small movement between the slips 64 and the casing 134, without the full weight of the casing being transferred through the top circulating head to the connector 116, which would cause the shear bolts to shear, resulting in down-time. Also, if an operator tries to pick up the casing with the slips disengaged, then the spring 136 will compress further under this load as the slick joint 118 is pulled out of the bell 122. The surface of the slick joint 118 is coated in a visible color (for example black or red) below the level where the slick joint 118 is normally visible. As the pull continues, more and more colored slick joint will appear, until the shear bolts shear. This color change should alert the operator that something is wrong.

The external saver sub assembly 121 is a hinged collar that fits onto the flange of connector 116. When the casing 134 is lowered into a hole, it may stick sufficiently to hold the entire weight of the casing. If the operator is not monitoring the load indicator, and continues lowering the top drive, then the slick joint 118 will slide down into the bell 122. As this is happening, the slips 64 will release automatically and slide down the casing.

At this point, the slick joint 118 will have slid all the way down into the bell until the external saver sub assembly 121 engages the keeper plate 127. Now if the operator lifts the top drive, the slips 64 will engage and start lifting the casing 134.

It takes about 50 70 mm of downward movement to release the slips 64. This is no longer possible because the external saver sub assembly 121 is engaging the keeper plate 127. In order to release the slips, the external saver sub assembly 121 is opened. This enables the top drive to be lowered sufficiently to release the slips, and the slick joint to be pulled up to its operating position. The external saver sub assembly 121 can then be closed. As an alternative, an internal saver sub assembly (comprising an inflated torus 143) can be deflated to permit the terminal collar 138 to move upwards inside the bell 122 sufficiently to release the slips.

Figure 17:
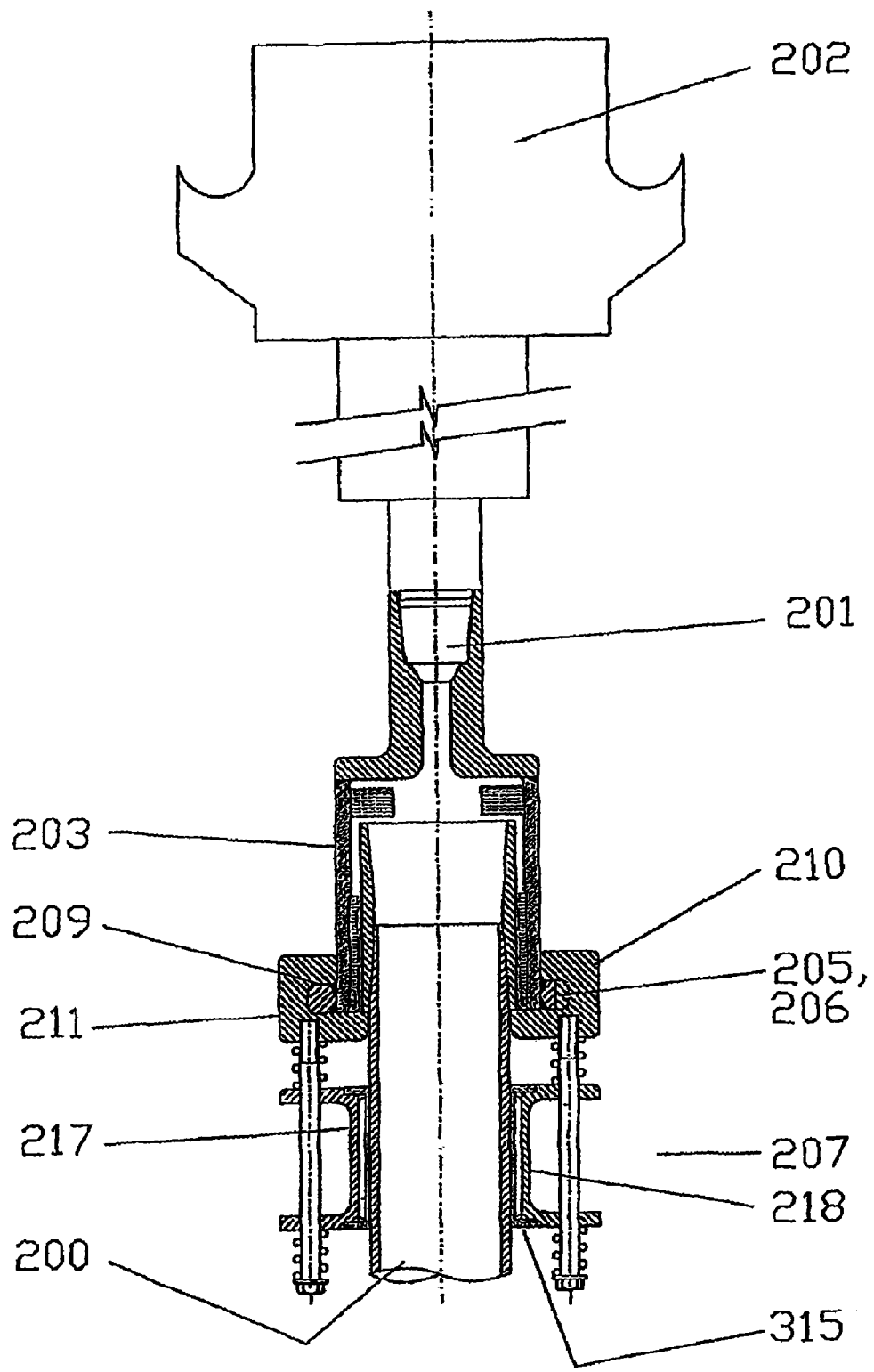
FIG. 17 is a cross-sectional right side view of a casing drilling system.
Figure 18:
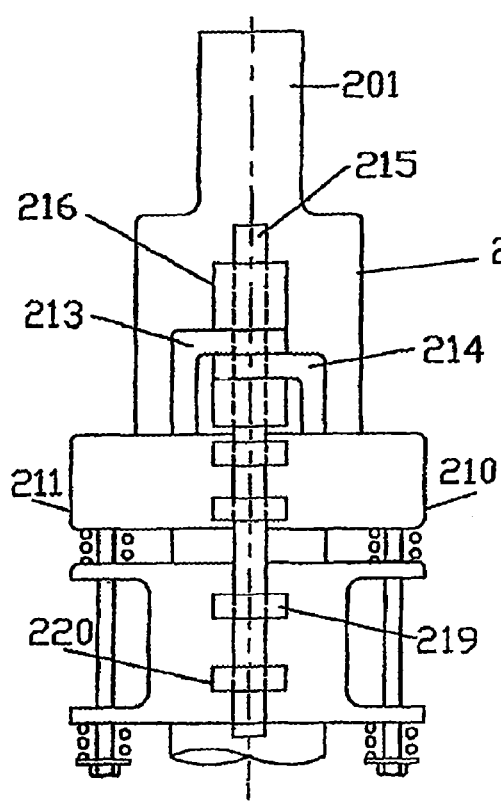
FIG. 18 is a right side view of the system of FIG. 17, with some parts shown in silhouette.
Figure 19:
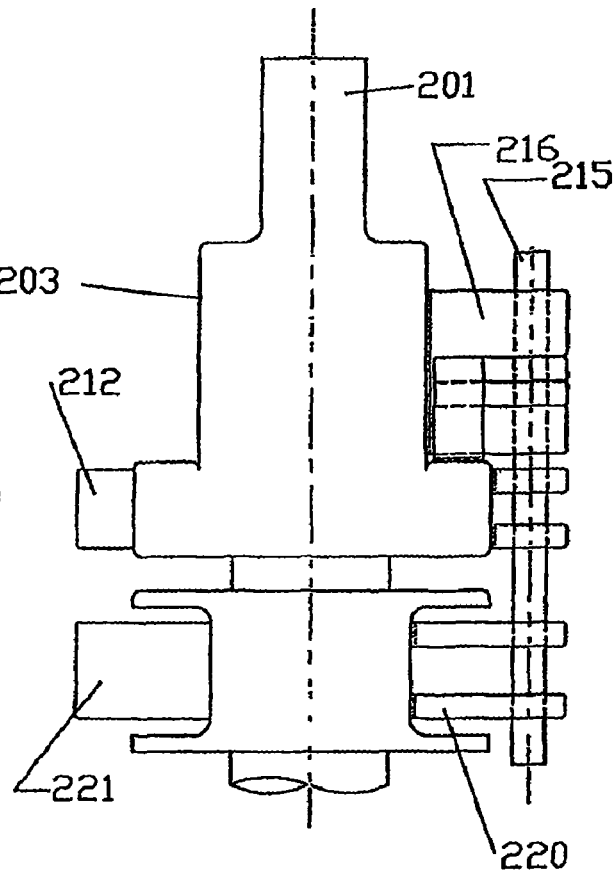
FIG. 19 is a front view of the system of FIG. 17, with some parts shown in silhouette.
Figure 21:
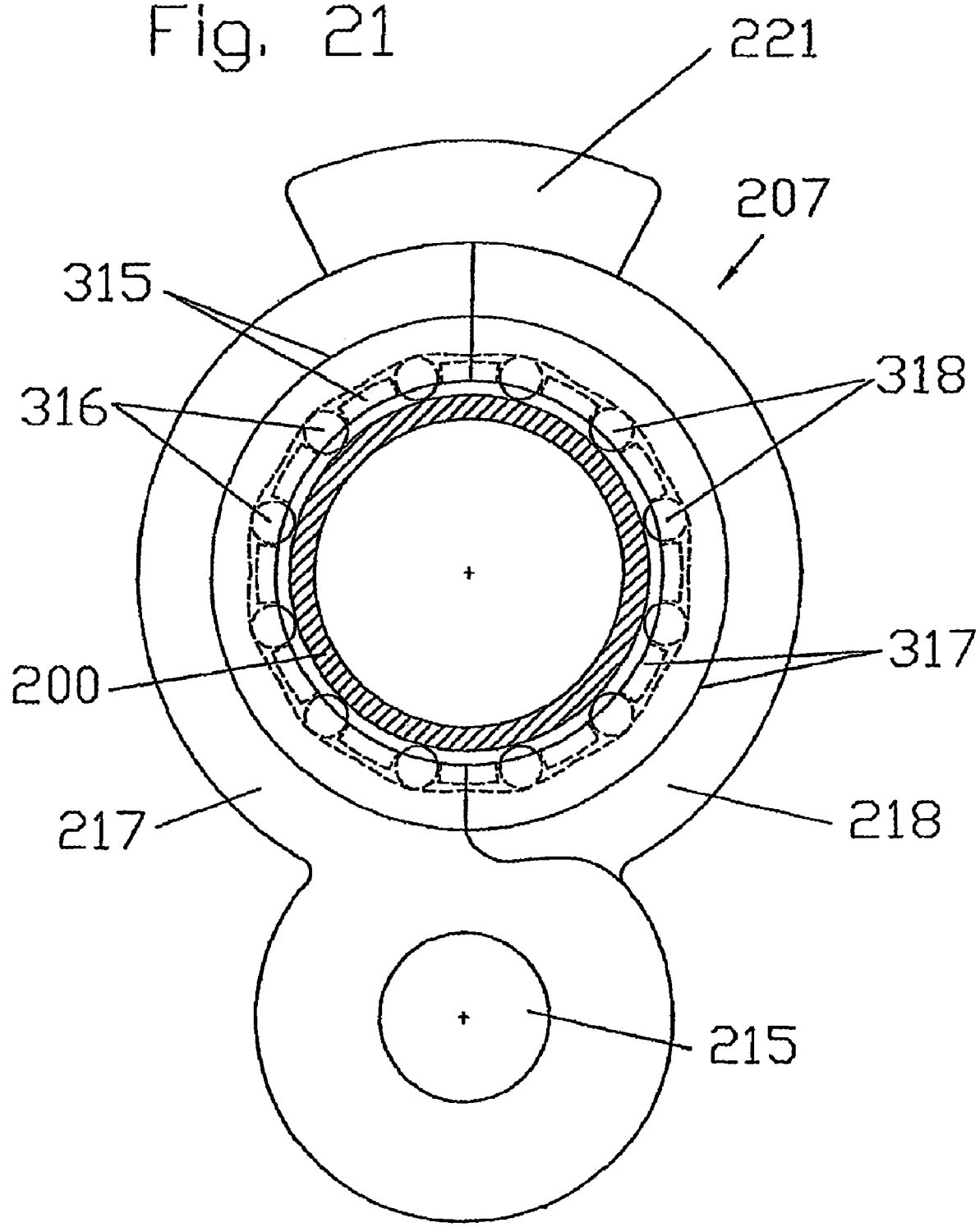
FIG. 21 is a plan view of the hypergrip system.

A casing drill-in system is shown in FIGS. 17 21. Casing 200 has a drilling tool (not shown) mounted on its end. A suitable type of drilling tool is described in WO/0146550. The system can lift, rotate and push down on the casing 200 during a drilling operation. Lubricating mud can also be directed under pressure down the casing 200 through the top drive connection, as in the previously described embodiments.

Figure 20:
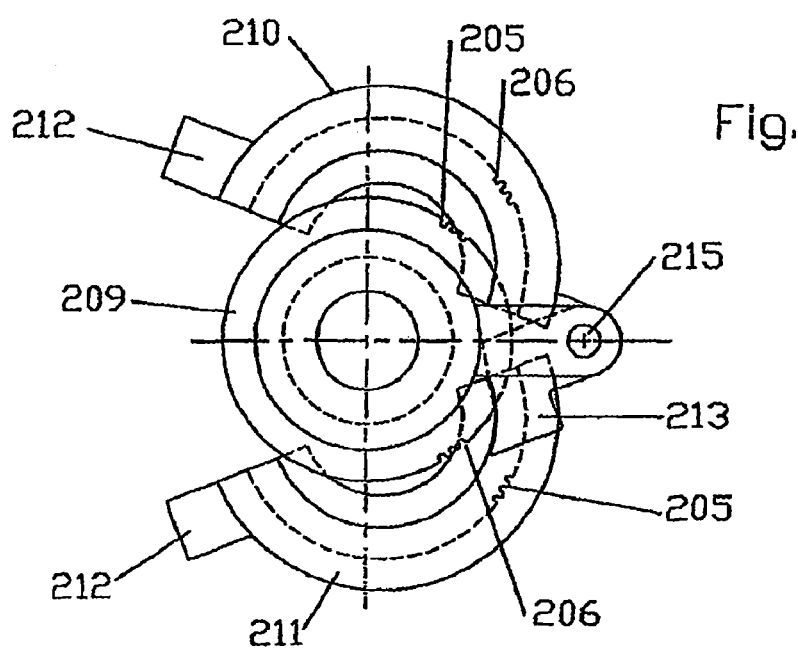
FIG. 20 is a plan view showing the locking assembly in its open position.

Top drive connection 201 is coupled to a top drive 202. The top drive connection 201 is welded directly to bell tube 203. The structure of the top circulating head is similar to the structure shown in FIG. 16. The casing is locked into the bell by a pair of doors 210, 211 shown in their open position in FIG. 20. The doors 210, 211 are clamped shut by a clamp mechanism 212. Door 211 is mounted on a top hinge plate 213 and door 210 is mounted on a bottom hinge plate 214. For clarity, the bottom hinge plate 214 is omitted from FIG. 20. The hinge plates rotate about a hinge pin 215 which is coupled to the bell 203 by a mounting member 216. Each door 210, 211 is formed with a number of gear teeth 205 which are received in recesses 206 formed in the bell flange 209, as shown in the plan view of FIG. 20.

The arms 210, 211 each are connected to a respective jaw of a hypergrip system 207 of the kind shown in detail in FIG. 21. The connection is made by approximately ten extended mounting bolts which each carry a pair of springs, with the hypergrip system 207 mounted between the springs. The system of FIG. 21, and alternative gripping systems, are described in detail in WO 01/21933, the contents of which are incorporated herein by reference. The system 207 has a pair of jaws 217, 218 which are connected to respective hinge plates 219, 220 which rotate about the pivot pin 215. The jaws 217, 218 are clamped in place by a clamping mechanism 221.

Jaw 217 includes a semi-circular cage 315 containing rollers 316. Jaw 218 includes a semi-circular cage 317 containing rollers 318. The inner faces of jaws 217 and 218 adjacent cage assemblies 315 and 317 have recesses formed therein which have ramp surfaces for wedging the rollers against the casing 200.

The jaws 217 and 218 may pivot away from each other so that the jaws may open. This enables the casing 200 to be axially introduced between the jaws and the jaws closed to retain the casing.

When cages 315 and 317 are in their initial positions, rollers 316 and 318 are positioned adjacent the apexes of the recesses formed in the jaws. This allows the casing 200 to be rotated in either direction. When it is desired to grip the casing 200, cages 315 and 317 are rotated relative to jaws 217 and 218 in the direction in which rotation is to be restrained. This brings rollers 316 and 318 into engagement with their respective ramp surfaces so as to wedge the rollers 316 and 318 between the outer surface of casing 200 and jaws 217 and 218. To release casing 200 it may be rotated in the opposite direction and locking mechanism 212 is released to open the jaws.

The majority of the weight of the casing 200 is transferred to the top drive 202 via the doors 210, 211, bell flange 209, bell tube 203 and top drive connection 201. Torque can also be transferred from the top drive 202 to the casing 200 via the same elements (including the gear teeth 205 and recesses 206).

The system of FIG. 17 is intended to be used to drill relatively shallow wells, thus restricting the string weight to a maximum of about 100 tons (224,000 lbs). A circulating pressure of about 2500 psi is also envisaged. Torque values in the range of 0 30,000 ft lbs are also envisaged.

The teeth 205 and recesses 206 can transmit torque up to approximately 30,000 ft lbs to the hypergrip system 207 via the mounting bolts. In the event of an overload, the hinge pin 215 is able to carry the excess.

During drilling, mud is pumped down the casing and passes up the well on the outside of the casing, bringing drilling cuttings up to the surface. When a desired depth has been reached, cement is pumped down the inside of the casing. The cement may be pumped through the circulating head shown in FIGS. 17 21, or using a different pump connection apparatus. A plug is then driven down, which forces the cement up the outside of the casing. The cement then dries and seals the casing in place.

If further depth is required, then casing of a smaller diameter can be passed down inside the existing casing, with a smaller drill bit mounted on its end. The drill-bit can then drill through the existing drill-bit and the process is repeated.

If the casing 200 is lifted while the hypergrip system 207 is transferring torque, then the lower springs supporting the hypergrip system will compress. Similarly, the upper springs will compress if a downward push is made on the casing 200. This prevents the rollers 316, 318 from taking up axial load, which would cause deformation of the cages 315, 317 (which are designed to take up the weight of the rollers only).

It should be noted that the casing is engaged on its external surface by the hypergrip system 207 and the top circulating head assembly. As a result, if any of these components breaks up, parts will not fall down the interior of the casing 200.

Also the hypergrip system 207 is actuated independently of the mud circulation system.

Although this invention has been described by way of example and with reference to possible embodiments thereof, it is to be understood that modifications and improvements may be made without departing from the spirit or scope of the invention.

The invention claimed is:

1. An apparatus for use with a tubular, the apparatus comprising:
    a body having a bore formed therein, the body movable between an open position in which the tubular can be inserted into the bore of the body and a closed position in which the body engages the tubular, wherein the body includes a gear teeth arrangement between a first portion of the body and a second portion of the body that engages when the body is moved from the open position to the closed position; and
    a sealing member disposed in the body, wherein the sealing member is configured to engage an exterior surface of the tubular and form a seal between the body and the tubular.

2. The apparatus of claim 1, wherein the body is configured to support the tubular and transmit a torque to the tubular.

3. The apparatus of claim 1, wherein the body comprises a gripper member having at least one jaw.

4. The apparatus of claim 1, wherein the body is configured to engage a collar disposed on the tubular.

5. The apparatus of claim 1, wherein the body is configured to engage a shoulder on the tubular.

6. The apparatus of claim 1, wherein the sealing member is slidably mounted in the bore to permit the sealing member to translate into sealing engagement with the exterior surface of the tubular.

7. The apparatus of claim 1, wherein the tubular is a drill-pipe.

8. The apparatus of claim 1, wherein the tubular is a casing string.

9. An apparatus for use with a tubular, the apparatus comprising:
    a body having a bore formed therein;
    a sealing member configured to form a seal with an exterior surface of the tubular when the tubular is received in the bore of the body; and
    a gripper member having at least one door that are movable between an open position and a closed position, wherein the at least one door include a torque transmission member that mates with a corresponding torque transmission member in the body when the at least one door moves from the open position to the closed position and wherein the gripper member includes a grip portion configured to grip the tubular, the grip portion is selectively movable relative to the at least one door between a grip position and a non-grip position when the at least one door is in the closed position.

10. The apparatus of claim 9, wherein the gripper member is configured to transmit a torque to the tubular generated by a top drive.

11. The apparatus of claim 9, wherein the gripper member is configured to engage a collar disposed on the tubular.

12. The apparatus of claim 9, wherein the gripper member further includes a lever clamp mechanism that is configured to lock the at least one door in the closed position.

13. The apparatus of claim 9, wherein the at least one door pivot around a hinge point on the body between the open position and the closed position.

14. The apparatus of claim 9, wherein the at least one door move radially relative to the tubular between the open position and the closed position.

15. The apparatus of claim 9, wherein the sealing member is slidably mounted in the bore to permit the sealing member to translate into sealing engagement with the exterior surface of the tubular.

16. The apparatus of claim 9, wherein the torque transmission member is disengaged from the corresponding torque transmission member when the at least one door is in the open position.

17. The apparatus of claim 9, wherein the gripper member is configured to support the tubular.

18. The apparatus of claim 9, wherein a torque applied to the body is transmitted to the tubular via the torque transmission members and the grip portion of the gripper member.

19. A method of using an apparatus, the method comprising:
placing a tubular in a body of the apparatus and forming a seal between an external surface of the tubular and the body;
engaging the tubular by moving at least one door in a gripper member from an open position to a closed position, wherein the at least one door includes a torque transmission member that mates with a corresponding torque transmission member in the body when the at least one door moves to the closed position;
selectively gripping a surface of the tubular by moving a grip portion in the gripper member from a non-grip position to a grip position relative to the at least one door when the at least one door is in the closed position; and
transmitting a torque to the tubular via the body and the gripper member.

20. The method of claim 19, further comprising locking the at least one door by actuating a lever clamp mechanism.

21. The method of claim 19, wherein the at least one door pivots around a hinge point on the body between the open position and the closed position.

22. The method of claim 19, wherein the at least one door moves radially relative to the tubular between the open position and the closed position.

23. The method of claim 19, wherein the gripper member is configured to support the tubular.

24. The method of claim 19, wherein the torque is applied to the body and subsequently transmitted to the tubular via the torque transmission members and the grip portion of the gripper member.

25. The method of claim 19, wherein the torque transmission member and the corresponding torque transmission member comprise a gear teeth arrangement.

26. An apparatus for use with a tubular, the apparatus comprising:
a body having a bore formed therein;
a sealing member configured to form a seal with an exterior surface of the tubular when the tubular is received in the bore of the body; and
a gripper member having a first door and a second door that are movable radially relative to the tubular between an open position and a closed position, wherein the first door and the second door include a torque transmission member that mates with a corresponding torque transmission member in the body when the doors move from the open position to the closed position and wherein the gripper member is configured to support the tubular and wherein the gripper member is configured to transmit a torque to the tubular generated by a top drive and wherein the gripper member includes at least one hydraulic cylinder that is configured to move the doors radially relative to the tubular.

27. An apparatus for use with a tubular, the apparatus comprising:
a body having a bore formed therein;
a sealing member configured to form a seal with an exterior surface of the tubular when the tubular is received in the bore of the body; and
a gripper member having a first door and a second door that are movable between an open position and a closed position, wherein the first door and the second door include a torque transmission member that mates with a corresponding torque transmission member in the body when the doors move from the open position to the closed position, wherein the torque transmission member is gear teeth and wherein the gripper member is configured to support the tubular and the gripper member is configured to transmit a torque to the tubular generated by a top drive.

* * * * *